(12) United States Patent
Ichihara et al.

(10) Patent No.: US 6,557,521 B2
(45) Date of Patent: May 6, 2003

(54) FUEL SUPPLY SYSTEM FOR INTERNAL COMBUSTION ENGINE

(75) Inventors: Takanobu Ichihara, Hitachinaka (JP); Masami Nagano, Hitachinaka (JP); Toshiharu Nogi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/820,318

(22) Filed: Mar. 29, 2001

(65) Prior Publication Data

US 2001/0039936 A1 Nov. 15, 2001

(30) Foreign Application Priority Data

Mar. 29, 2000 (JP) ......................................... 2000-095218

(51) Int. Cl.[7] .................................................. F02B 3/00
(52) U.S. Cl. ........................ 123/299; 123/480; 123/491; 123/543
(58) Field of Search ................................ 123/299, 301, 123/480, 490, 491, 585, 472, 531, 533, 478, 543, 545, 547, 557; 701/113

(56) References Cited

U.S. PATENT DOCUMENTS 4,825,834 A * 5/1989 Toshimitsu et al. .......... 123/463
5,284,117 A * 2/1994 Akase ......................... 123/445

* cited by examiner

Primary Examiner—Hieu T. Vo
Assistant Examiner—Johnny H. Hoang
(74) Attorney, Agent, or Firm—Crowell & Moring LLP

(57) ABSTRACT

With a composition where there are provided an injection valve installed on each cylinder and a high-atomizing injection valve installed in the upstream, it is aimed to prevent worsened start-up performance and unburnt gas exhaust resulting from adhesion of the fuel on the suction air passage as a result of reduced air for atomization during the start-up cranking.

With a composition equipped with an injection valve installed on each cylinder of an internal combustion engine and an air-assist type high-atomizing injection valve in the upstream, there is provided an injection controlling means that injects the fuel by the injection valve installed on the suction port during the start-up cranking.

45 Claims, 12 Drawing Sheets

INJECTION VALVE AIRFLOW RATE (L)

⟶ LOWER

SUCTION PATH PRESSURE

FUEL SUPPLY SYSTEM FOR INTERNAL COMBUSTION ENGINE

BACKGROUND OF THE INVENTION

The present invention relates to a fuel supply system for an internal combustion engine.

As a prior art, there has been proposed a system that aims to decrease adhesion of the fuel on the suction air passage and suction valve, by heating and gasifying the fuel injected by a fuel injection valve with a heater installed in a suction air passage, so as to particularly improve combustion at cold start-up and reduce hazardous hydrocarbon exhaust. As in a U.S. Pat. No. 5,894,832, for example, there has been a system having a composition where, in addition to a fuel injection valve (port fuel injection valve) installed near a suction port of each cylinder, a fuel injection valve (upstream fuel injection valve) and a heater are installed in an auxiliary air passage bypassing a throttle valve, aiming to prevent adhesion of the fuel on the suction air passage and improve combustion by injecting fuel onto the heater in the warming-up process after cold start-up so as to facilitate gasification of the fuel with the heater. Since gasification of the fuel is effective for improving combustion, the above known art has an advantage that hazardous hydrocarbon exhaust after cold start-up can be reduced by heating and gasifying fuel with the heater during idling after start-up as well as by setting the delay angle of ignition timing greater than in a conventional engine equipped with no heater so as to increase the exhaust temperature and accelerate the activity of catalysts.

In the above-mentioned U.S. patent, however, there remains a problem that, because almost all fuel injected is adhered onto the heater, a large capacity heater is needed for gasification and therefore power consumption increases and, further, a larger size heater is needed.

It is generally known that, if fuel is atomized into a particle size of about 10 microns, fuel particles can be carried by air flow and accordingly the fuel can be carried into the cylinder without adhesion on the suction air passage. For this reason, if an air-assist type high-atomizing injection valve is employed as the fuel injection valve installed in the upstream so as to let the fuel flow directly into the cylinder, heater can be eliminated from the composition of a system. If some fuel still adheres on the suction air passage due to unevenness of the fuel particles of the high-atomizing injection valve, it will be possible to compose a system where part of the fuel is let directly into the cylinder and the rest is adhered on the heater so as to decrease adhesion of the fuel on the suction air passage and decrease the power consumption of the heater accordingly.

With a system where the afore-mentioned air-assist type high-atomizing injection valve is employed in order to decrease the adhesion of the fuel on the suction air passage so as to eliminate the heater or decrease the power consumption of the motor consequently, however, there still remains a problem as follows. That is, the air-assist type injection valve takes in the air for fuel atomization from the upstream of the throttle valve but, because the pressure differential between the upstream of the throttle valve and the suction air passage in the downstream of the injection valve becomes lower during the start-up cranking, the air volume for fuel atomization decreases and atomization is not facilitated, and consequently fuel particles of larger sizes adhere on the suction air passage. As a result, flow of the fuel into the cylinder delays and start-up performance worsens. Besides, a lot of unburnt gas is exhausted until complete explosion because it takes a longer time for the inflow fuel into the cylinder to reach a certain quantity enough for stable combustion.

With a system equipped with a heater, there remains another problem that gasification of the fuel on the heater is not facilitated resulting from decreased airflow rate through the heater and higher pressure through the suction air passage during the start-up cranking, and consequently, start-up performance worsens and a lot of unburnt gas is exhausted.

Besides, because the pressure differential between upstream of the throttle valve and the suction air passage in the downstream of the injection valve becomes lower under a condition where the suction air passage pressure increases like in acceleration, the air for fuel atomization of the air-assist type injection valve becomes short and consequently fuel atomization is not facilitated. As a result, the amount of the fuel adhering on the suction air passage increases and accordingly the amount of the fuel flowing into the cylinder decreases, resulting in combustion worsening and hazardous gas exhaust.

SUMMARY OF THE INVENTION

The composition of the present invention for solving the above problem is shown in FIG. 1.

The first composition of the present invention is a fuel supply system for an internal combustion engine, which is equipped with a port fuel injection valve 2 installed near a suction port of each cylinder and an air-assist type upstream fuel injection valve 3, installed in a suction air passage in the upstream of the port fuel injection valve 2 or in an auxiliary air passage bypassing a throttle valve, that facilitates atomization of the fuel by introducing air into or near a fuel injection port; and also equipped with an injection controlling means 1 that injects fuel during the start-up cranking at least by the port fuel injection valve 2 and injects fuel as well after start-up at least by the upstream fuel injection valve 3.

The second composition of the present invention is a fuel supply system for an internal combustion engine, which is equipped with a port fuel injection valve 2 installed near a suction port of each cylinder; an upstream fuel injection valve 3 installed in a suction air passage in the upstream of the port fuel injection valve or in an auxiliary air passage bypassing a throttle valve; a heater part 4, installed in the injection direction of the upstream fuel injection valve 3, that gasifies whole or part of the injection fuel of the upstream fuel injection valve by heating; and a heater controlling means 5 that energizes the heater part; and also equipped with an injection controlling means 1 that injects fuel during the start-up cranking at least by the port fuel injection valve 2 and injects fuel as well at least by the upstream fuel injection valve 3 when and after the engine rotation speed exceeds a specified value, or when and after the suction air passage pressure becomes lower than a specified value, or when and after a detected suction air volume exceeds a specified value.

The third composition of the present invention is a fuel supply system for an internal combustion engine, which is equipped with a port fuel injection valve 2 installed near a suction port of each cylinder and an air-assist type upstream fuel injection valve 3, installed in a suction air passage in the upstream of the port fuel injection valve 2 or in an auxiliary air passage bypassing a throttle valve, that facilitates atomization of the fuel by introducing air into or near a fuel injection port; and also equipped with an injection controlling means that varies the injection quantity ratio of the port fuel injection valve 2 to the upstream fuel injection valve 3.

PREFERRED EMBODIMENTS OF THE INVENTION

Figure 1:
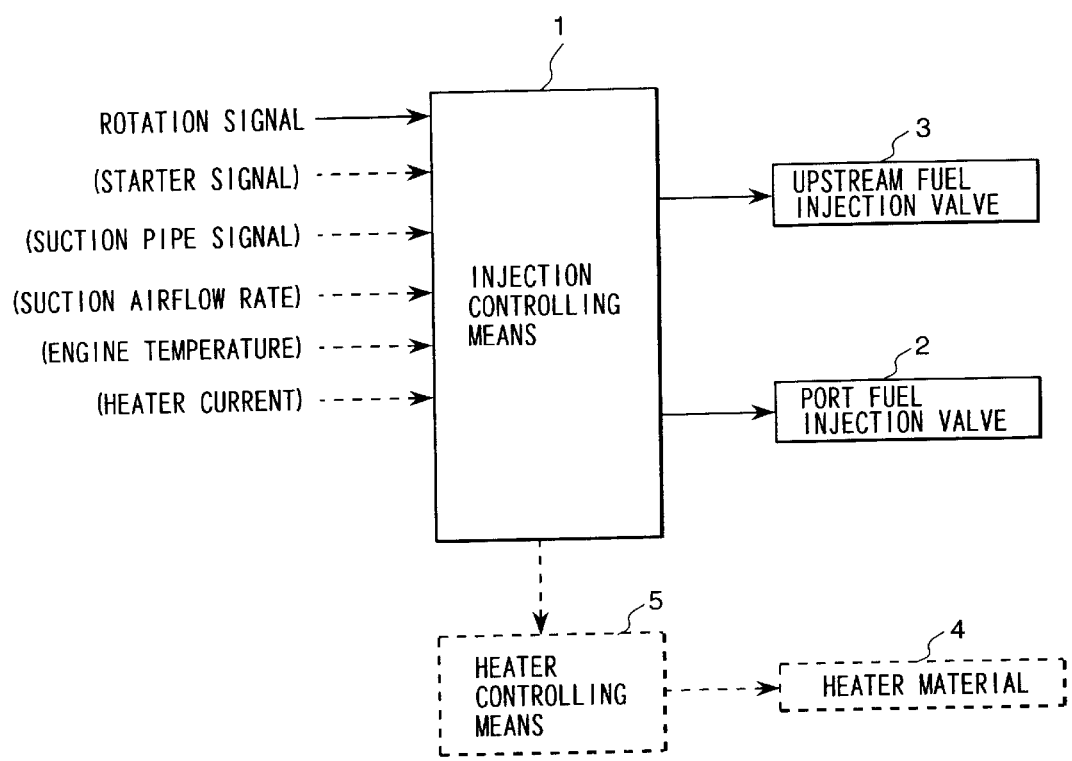
FIG. 1 shows a schematic diagram of the present invention.
Figure 2:
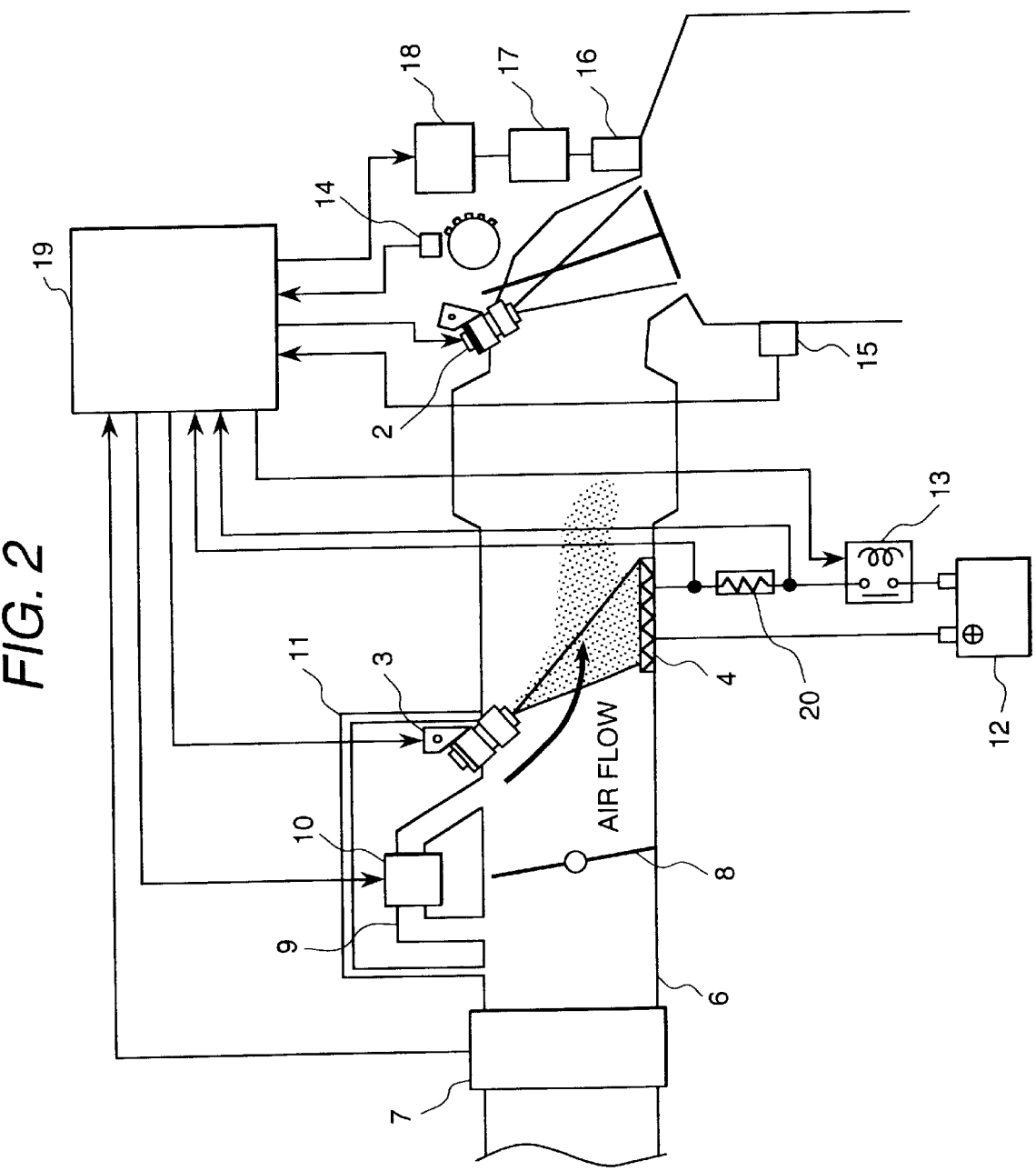
FIG. 2 a diagram (1) showing the system composition to which the present invention applies.

Preferred embodiments of the invention are explained hereunder. FIG. 2 shows the composition of a system to which the present invention applies, where there are provided a suction air volume sensor 7 and a throttle valve 8 in a suction air passage 6 of the engine. A port fuel injection valve 2 is installed at the suction port inlet of each cylinder. In the upstream of the suction air passage, there are provided an air-assist type high-atomizing injection valve (upstream fuel injection valve) 3 and an air passage 11 for taking in the air for fuel atomization from the upstream of the throttle valve 8 and supplying the air to the upstream fuel injection valve 3. Since it is generally known that, if fuel is atomized into a particle size of about 10 microns, fuel particles can flow into the cylinder without adhering on the suction air passage, the fuel to be injected by the upstream fuel injection valve 3 is atomized into sizes of about 10 microns so that less fuel adheres on the suction air passage. A heater 4 is installed in the injection direction of the upstream fuel injection valve 3. The heater can be, for example, a PTC heater that can maintain the temperature constant. Current is supplied to the heater 4 from a battery 12 through a heater relay 13. Current through the heater is detected in terms of the terminal voltage of a current detecting resistor 20. An auxiliary air passage 9 bypassing the throttle valve is equipped with an idle speed control valve (ISC valve) 10 that controls the auxiliary air volume. The outlet shape of the auxiliary air passage 9 is so formed that the air flow is directed to the heater 4. Although the particles of the fuel from the upstream fuel injection valve are not even in size and some are larger, fuel particles of smaller sizes among the fuel injected from the upstream fuel injection valve are carried downstream by air flow and flow directly into the cylinder. As a result, since it is only those particles of larger sizes that adhere on the heater, the power consumption of the heater can be reduced as compared to a system where all fuel is adhered on the heater. The engine is equipped with a crank angle sensor 14 for detecting the rotation speed, a cooling water temperature sensor 15, and an ignition system comprising of an ignition plug 16, ignition coil 17 and power switch 18. Signals of each sensor are inputted to a control unit 19, and the port fuel injection valve 2, upstream fuel injection valve 3, heater 4, heater relay 14, ISC valve 10, and power switch 18 are controlled by the control unit 19.

Figure 4:
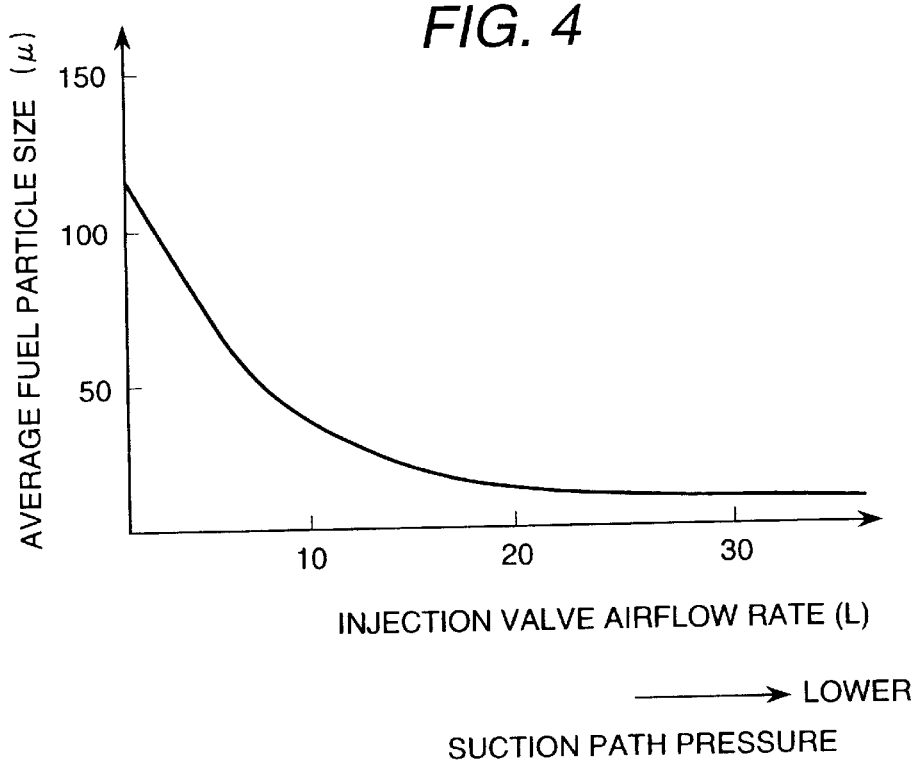
FIG. 4 diagram showing the relationship between the air flow volume of the injection valve and the particle size.

In case of a composition like the above where an air-assist type fuel injection valve is employed as the upstream fuel injection valve, the air for atomizing the fuel is taken in from the upstream of the throttle valve and injected to the downstream of the injection valve. Thus, during the start-up cranking wherein the pressure differential between the upstream of the throttle valve, which is almost at the atmospheric pressure, and the downstream of the injection valve decreases, the air for atomization becomes short and atomization is not facilitated. FIG. 4 shows the relationship between the atomization air volume for the air-assist type fuel injection valve and the average particle size. Because the suction air passage in the downstream of the injection valve becomes lower during idling or partial-load driving and consequently the pressure differential against the upstream of the throttle valve becomes higher, sufficient air flow volume for the injection valve can be maintained and the average particle size becomes as small as about 10 microns. When this applies, the fuel particles atomized into sizes of 10 microns or smaller are carried by air flow and flow into the cylinder without adhering on the suction air passage. During the start-up cranking, on the other hand, because the pressure through the suction air passage in the downstream of the injection valve becomes closer to the atmospheric pressure and consequently pressure differential is hardly generated against the upstream of the throttle valve to cause little air flow through the injection valve, the particle sizes increase to, for example, about 120 microns. With the composition shown in FIG. 2, the fuel particle size of the upstream fuel injection valve becomes larger during the start-up cranking because of the above reason, and consequently the amount of the fuel carried by air flow directly into the cylinder decreases and most of the fuel adheres on the heater 4. As a result, an amount of the fuel in excess of the gasification capacity of the heater adheres on the heater and the fuel that has not been gasified by the heater flows on the wall of the suction air passage (unburnt fuel), resulting in a problem that flow of the fuel into the cylinder delays, start-up performance worsens, and a lot of unburnt gas is exhausted.

Figure 5:
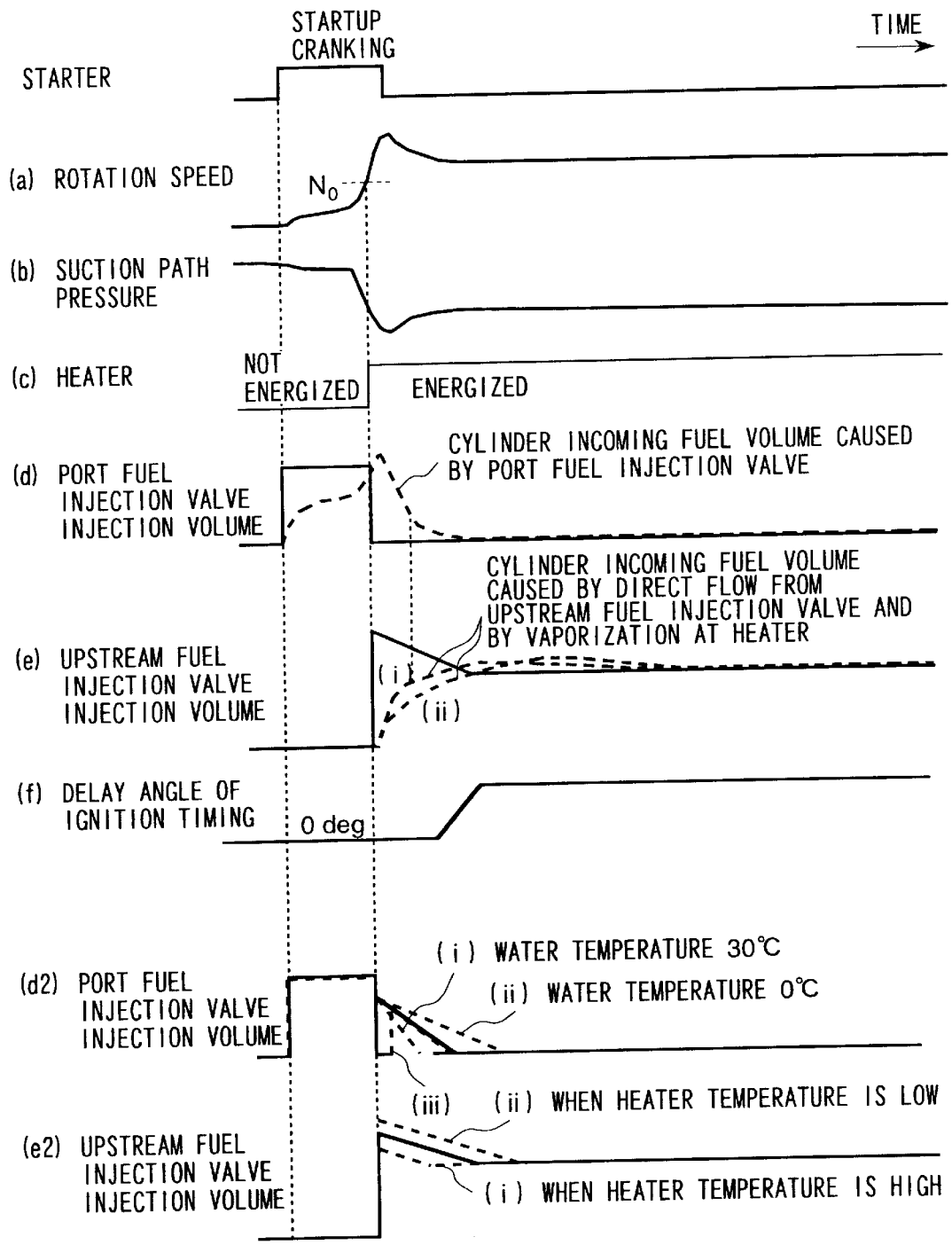
FIG. 5 an explanatory sketch (1) showing the injection control of the present invention.

Explained hereunder, using FIG. 5, is the fuel injection control of the present invention aiming to prevent a trouble resulting from a fact as above that the fuel atomization at an air-assist type upstream fuel injection valve is not facilitated during the start-up cranking as above. According to the invention, start-up of an engine involves not only start-up cranking by a starter but also fuel injection by the port fuel injection valve as shown in (d).

Although some fuel adheres on the suction air passage and valve and consequently the flow of the fuel into the cylinder delays even when the fuel is injected by the port fuel injection valve, the particle sizes of the fuel from the port fuel injection valve are generally 70 microns or so. On the other hand, when the fuel is injected by the upstream fuel injection valve during the start-up cranking, the particle sizes of the fuel from the upstream fuel injection valve come into, for example, 120 microns because air for atomization is little supplied. As a result, since most of the fuel adheres on the suction air passage and valve as explained above, the amount of adhered fuel is greater than in start-up by the port fuel injection valve. Besides, delay of the fuel transport is caused if the injection valve is located in the upstream, and it has been confirmed through an experiment by the inventor et al. that the delay of the fuel flow into the cylinder in case of the start-up by the upstream fuel injection valve is greater than that in case of the start-up by the port fuel injection valve. Because of this, the start-up performance can be improved by injecting the fuel by the port fuel injection valve during the start-up cranking. In the experiment, while the start-up time was about 1.8 seconds in case of the start-up fuel injection by the upstream fuel injection valve, it was possible to shorten the start-up time to 0.5 second in case of the start-up fuel injection by the port fuel injection valve. Since the delay of the inflow fuel into the cylinder until it reaches a quantity enough for combustion decreases, an amount of unburnt gas exhaust before the complete explosion can be reduced.

When and after the engine rotation speed (a) has increased higher than a specified value (complete explosion judgment level) after the start-up by the port fuel injection valve, the suction air passage pressure shown in (b) becomes lower because of the sucking action of the engine and consequently the pressure differential between the upstream of the throttle valve and the suction air passage in the downstream of the injection valve becomes lower and air for atomization is supplied. Thus, the fuel is atomized sufficiently, wherein if the injection by the port fuel injection valve is stopped as shown by a bold line (d) and the injection by the upstream fuel injection valve is started as shown by a bold line (e), high-atomized fuel flows into the cylinder without adhering on the suction air passage. Thus, the combustion can be improved. On this occasion, at the same time of the start of the injection by the upstream fuel injection valve, energization of the heater is started as shown in (c).

Since the fuel adhesion on the suction air passage is less and combustion stability is higher after the start of the injection by the upstream fuel injection valve than in the injection by the port fuel injection valve, the delay angle of the ignition timing is corrected as shown in (f) so as be able to increase the exhaust temperature and facilitate the activity of the catalysts. In consideration of the power consumption of the heater, it is so arranged that the heater is energized and the fuel is injected by the upstream fuel injection valve only for several tens of seconds, for example, after the cold start-up until the activation of the catalysts so as to activate the catalysts and that the injection by the upstream fuel injection valve and energization of the heater are stopped after the above and the fuel is injected by the port fuel injection valve.

Although the fuel is injected by the port fuel injection valve during the start-up cranking according to this embodiment, it is also allowable that, while the fuel is injected by the port fuel injection valve during the start-up cranking, part of the fuel is injected by the upstream fuel injection valve at the same time in-as-much as not in excess of the gasifying capacity of the heater.

When the heater capacity is small, it is also allowable that part of the fuel continues to be injected by the port fuel injection valve even after the start of the injection by the upstream fuel injection valve so as to decrease adhesion of the fuel on the heater.

As explained above, with a composition equipped with a port fuel injection valve on each cylinder of an internal combustion engine and an air-assist type upstream fuel injection valve, capable of high atomization, in the upstream of a suction air passage, the adhesion of fuel on the suction air passage increases during the start-up cranking because air for atomization is not supplied to the upstream fuel injection valve, resulting in insufficient atomization, and the delay of fuel supply to the cylinder is significant because the upstream fuel injection valve is located apart from the cylinder. In the present invention, taking the above into consideration, the fuel is injected mainly from the port fuel injection valve during the start-up cranking for starting up an engine and then mainly from the upstream fuel injection valve, capable of high atomization, after the start-up (that is, fuel injection valves are switched). Thus, worsened start-up performance and unburnt gas exhaust can be prevented and stable fuel injection after the start-up can be realized.

Although this embodiment shows an application to an engine that is equipped with an injection valve on the suction port of each cylinder, the present invention is applicable also to an inner injection type engine that is equipped with an injection valve inside the fuel chamber of each cylinder. If the fuel is injected mainly by the inner injection valve, which causes less delay of fuel supply than the upstream fuel injection valve, during the start-up cranking and then mainly by the upstream fuel injection valve after the start-up, a similar effect can be attained.

It is also allowable to set the start timing of the injection by the upstream fuel injection valve at the start-up to such that the injection is started when a specified delay time or longer has elapsed after the cranking under a condition that the engine rotation is in excess of a specified speed so as to prevent a faulty operation due to temporary engine speed variation during the start-up. This enables to switch the injection valves under a condition that the engine speed has increased enough for stable combustion condition and also for obtaining a necessary amount of air for atomization of the fuel of the upstream fuel injection valve.

When a pressure sensor is installed in the suction air passage, it is also allowable to set the start timing of the injection by the upstream fuel injection valve at the start-up to such that the injection is started when the detected suction air passage pressure has reduced lower than a specified value or, if the sensor is to detect the pressure differential between the atmospheric pressure and the suction air passage pressure, the injection is started when the pressure differential has exceeded a specified value. In order to prevent a faulty operation due to temporary engine speed variation during the start-up, it is also allowable that the injection by the upstream fuel injection valve is started when a specified delay time has elapsed after the suction air passage pressure has reduced lower than a specified time or the pressure differential between the atmospheric pressure and the suction air passage pressure has exceeded a specified value.

Even after the injection by the port fuel injection valve is stopped after the start-up, the fuel that was injected by the port fuel injection valve and adhered on the suction port during the start-up evaporates gradually and flows into the cylinder for a certain length of time as shown by a dotted line in (d). However, if the direct inflow fuel from the upstream fuel injection valve into the cylinder is relatively higher in percentage, such as 50% or more, than the fuel adhered on the heater, the injection valves can be switched, without worsening the combustion condition, by starting the injection by the upstream fuel injection valve after stopping the injection by the port fuel injection valve, because the fuel from the upstream fuel injection valve flows in good response, as shown by a dotted line (i) in (e), before the fuel evaporating from the suction port decreases.

Figure 13:
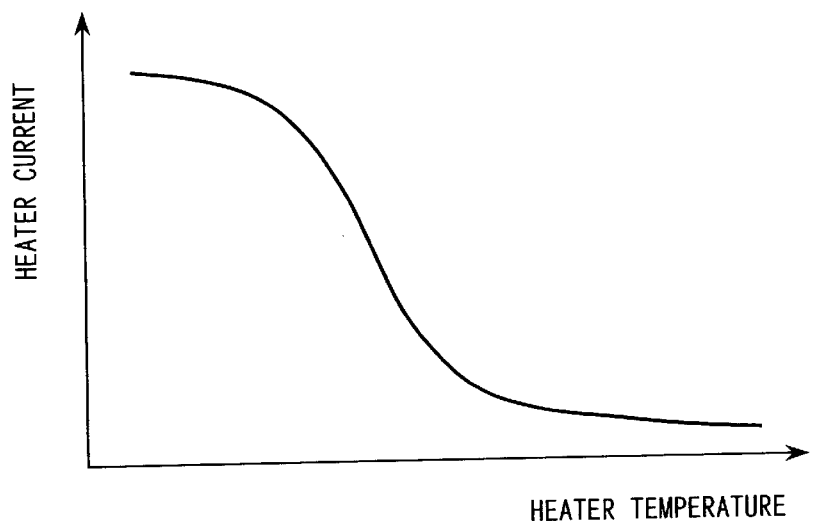
FIG. 13 a chart showing the relationship between the heater temperature and the heater current.

On the contrary, if the fuel adhered on the heater is higher in percentage than the direct inflow fuel from the upstream fuel injection valve into the cylinder, the effect of the delayed fuel gasification on the heater becomes greater as shown by a dotted line (ii) in (e) and consequently the fuel inflow into the cylinder delays. Because of the above, in order to maintain a necessary amount of the inflow fuel into the cylinder, it is also allowable to switch the injection valves in such a manner that the injection by the port fuel injection valve is not stopped immediately after the injection by the upstream fuel injection valve is started but reduced gradually as shown by a bold line in (d2) so as to supply insufficient fuel. The decrease characteristic of the injection quantity from the port fuel injection valve after the start-up is so set as to supply insufficient fuel that depends upon the amount of the gasified fuel from the heater and evaporated fuel from the suction port. However, since the inflow of the fuel injected by the port fuel injection valve into the cylinder delays due to the adhesion of the fuel on the suction port, it is also allowable to vary the decrease characteristic on the basis of a parameter related to the amount of adhered fuel, such as engine cooling water temperature, suction air passage pressure, engine rotation speed, detected suction air volume, start-up time (time from the start of start-up cranking until the rotation speed increase). For example, if the engine cooling water temperature is low when the fuel is injected by the port fuel injection valve after the start-up, the amount of the fuel adhered on the suction port increases. Thus, in order to make up for the decrease of the inflow fuel into the cylinder due to the adhesion of the fuel, the injection quantity of the port fuel injection valve after the start-up is decreased more gradually as shown by a dotted line (ii) in (d2) than in the decrease characteristic (i) for a case where the engine cooling water temperature is high. If the start-up time is longer, a greater amount of the fuel has adhered on the suction port until the completion of the start-up, and hence the amount of the fuel gasifying from the suction port after the start-up is also greater. For this reason, the injection quantity from the port fuel injection valve after the start-up is so varied as to decrease more gradually than when the start-up time is shorter. Further, since the amount of the fuel gasified by the heater depends upon the heater temperature, suction air passage pressure, suction air volume, and suction air temperature, it is also allowable to vary the decrease characteristic on the basis of a detected value or values of any one of or a combination of the heater temperature or related heater current or heater energizing time, suction air passage pressure or engine rotation speed, suction air volume, and suction air temperature. Since the PTC heater has a characteristic that, provided the voltage applied to the heater is constant, the heater current decreases as the heater temperature increases as shown in FIG. 13, heater temperature can be measured in terms of the heater current.

Varying the decrease characteristic of the fuel injected from the port fuel injection valve in the course of switching the fuel injection valves in accordance with detected values of the parameters relating to the amount of the fuel gasifying from the suction port and amount of the fuel gasifying from the heater as explained above makes it possible to prevent the engine speed variation and unburnt gas exhaust without causing uneven air-fuel ratio resulting from variation of the engine operating condition.

Although, in the above embodiment, the decrease characteristic of the fuel injected from the port fuel injection valve after the start-up is so set that the decrease speed is varied in accordance with the engine operating condition, it is also allowable to vary the delay time until the start of decreasing.

Since the suction air passage pressure decreases just after the start-up, there can be a case where, just after the start-up by the port fuel injection valve, the fuel adhered on the suction air passage evaporates all of a sudden, resulting in an excessive fuel condition. For this reason, in order to prevent the excessive fuel condition, it is also allowable to reduce the injection quantity from the port fuel injection valve at the timing when the inflow of the fuel into the cylinder increases temporarily just after the start-up as shown by a dotted line (ii) in (d2).

In the meantime, for a system where an air-assist type fuel injection valve is installed in the upstream of the suction air passage, if the atomization can be enhanced by improving the injection valve and consequently the average particle size can be further reduced so that the sizes of most fuel particles are reduced to less than 10 microns, the fuel particles can be carried by air flow into the cylinder without adhering on the suction air passage. An example of enhanced atomization by a fuel injection valve is disclosed in Japanese Patent Application Laid-Open Publication No. HEI 4-292573 (1992), where the atomization by the injection valve is enhanced by a method that the fuel is injected spirally for better atomization and then air is supplied from a nozzle so as to collide with the spiral injection to facilitate atomization.

With a composition where an injection valve like the above is installed in the upstream of the suction air passage, adhesion of the fuel on the suction air passage can be prevented and hence the combustion can be improved, without installing a heater, to the same extent as with a composition equipped with a heater. As a result, a composition shown in FIG. 3 where heater is eliminated enables to reduce the power consumption. Because there still remains the same problem even with this composition as with the composition shown in FIG. 2 that air for atomization is not supplied to the upstream fuel injection valve during the start-up cranking and consequently the fuel adheres on the suction air passage, the injection control of the present invention can apply.

The injection control of the invention can apply also to a composition where an air-assist type upstream fuel injection valve and a heater are installed on the auxiliary suction air passage bypassing the throttle valve.

Figure 3:
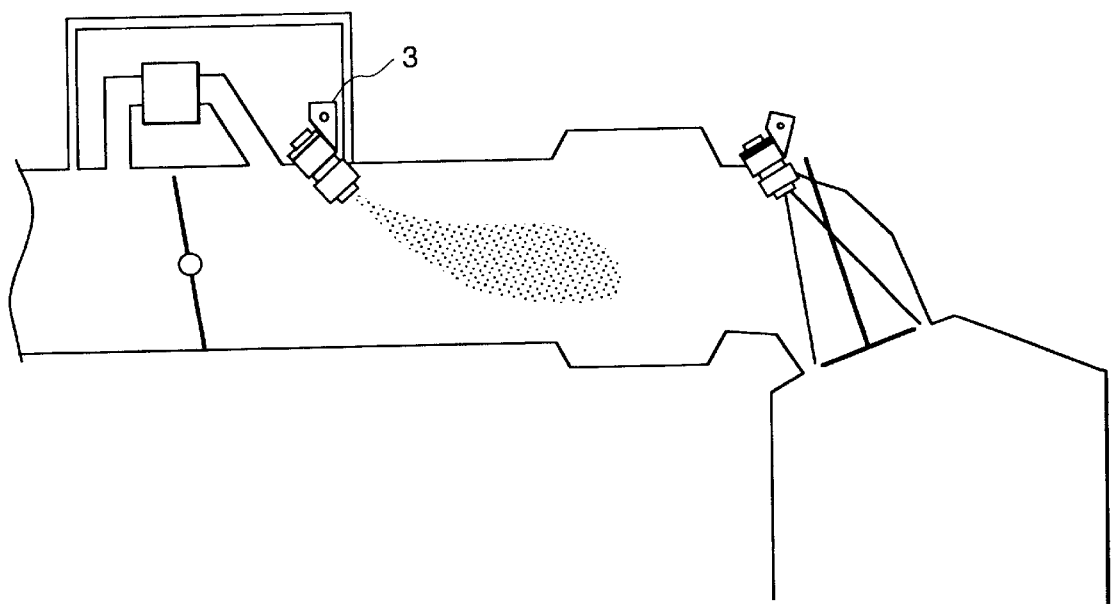
FIG. 3 a diagram (2) showing the system composition to which the present invention applies.

With a composition shown in FIG. 2 and FIG. 3, it is also allowable that the composition is equipped with no auxiliary suction air passage nor ISC valve but only a throttle valve as a valve for regulating the air volume and that the throttle valve is driven by a motor.

In the injection control according to the present invention, the injection quantity from the upstream fuel injection valve at the start of the injection after the start-up is increased greater than the amount of the fuel under a steady-state condition or the amount of the fuel realizing the theoretical air-fuel ratio in reference to the detected suction air volume so as to increase the evaporating surface area of the fuel and reduce the gasification delay of the fuel on the heater as shown by a bold line on FIG. 5 (e). However, since the gasification delay of the fuel on the heater depends upon the suction air temperature, it is also allowable to vary the increase characteristic of the upstream fuel injection valve at the start of the injection on the basis of a detected value or values of any one of or a combination of the heater temperature or related heater current or heater energizing time, suction air passage pressure or engine rotation speed, suction air volume or related engine cooling water temperature, and suction air temperature. In case of the start-up in a short elapsed time since the previous start-up, where gasification delay of the fuel on the heater is a little because the heater temperature is still high, if the fuel is increased by a similar increment as in the start-up from a normal cold condition, the inflow of the fuel into the cylinder becomes excessive, resulting in worsened combustion and exhaust of a lot of unburnt gas. To prevent this, the heater temperature is detected in terms of the heater current and, if the heater temperature is high, an increment of the fuel at the start of the injection by the upstream fuel injection valve is decreased as shown by a dotted line (i) in (e2) and, if the heater temperature is low, an increment of the fuel is increased as shown by a dotted line (ii) in (e2). In a case when the suction air volume is high, the increment must be decreased because the gasification of the fuel on the heater is facilitated by collision with the air and hence the gasification delay on the heater decreases. Instead of varying the increment of the fuel at the start of the injection, it is also allowable to vary the decrease speed of the increment.

Varying the increase characteristic of the fuel from the upstream fuel injection valve at the start of the injection in accordance with the engine operating condition or heater temperature (heater current) as explained above makes it possible to reduce the delay of the inflow fuel into the cylinder under different operating conditions of the engine, resulting in neither worsened combustion nor increased unburnt gas exhaust.

A method of increasing the fuel at the start of the injection from the upstream fuel injection valve so as to reduce the delay of the gasification on the heater as explained above is applicable not only to a system where an air-assist type injection valve is employed as the upstream fuel injection valve but to any system where the fuel is adhered on a heater and gasified there. In such a system, in order to prevent worse start-up performance resulting from the gasification delay of the fuel on the heater or transport delay of the fuel during the start-up, the fuel is injected by the port fuel injection valve during the start-up cranking and then, after the start-up, injected by the upstream fuel injection valve at the increase characteristic in accordance with the engine operating condition or heater temperature (heater current).

Figure 6:
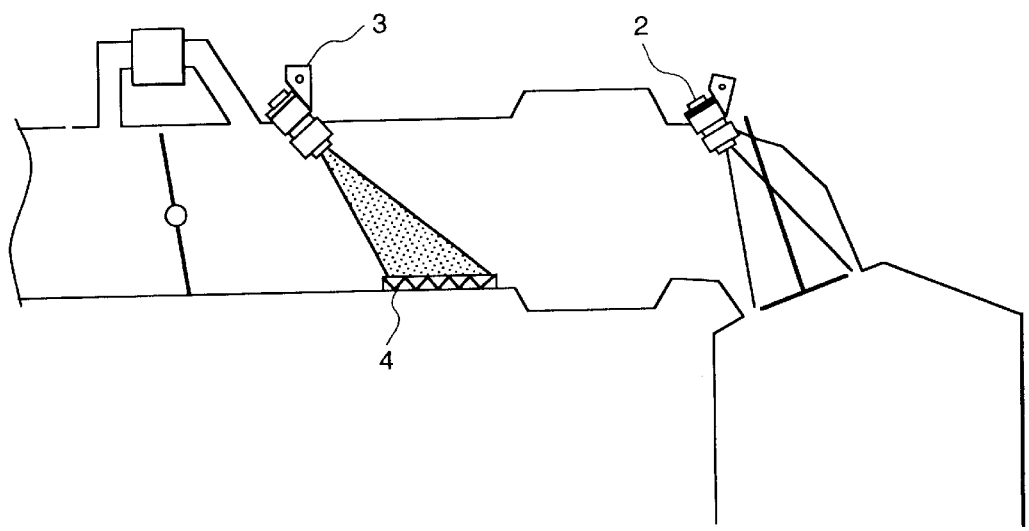
FIG. 6 a diagram (3) showing the system composition to which the present invention applies.

Next, for a composition equipped with an upstream fuel injection valve 3, port fuel injection valve 2, and heater 4 for gasifying the fuel injected from the upstream fuel injection valve 3 as shown in FIG. 6, a start-up injection control in view of the gasification characteristic of the heater is explained hereunder. The upstream fuel injection valve is not necessary be a high-atomizing injection valve such as an air-assist type but can be an ordinary pressurized-fuel type injection valve.

Figure 8:
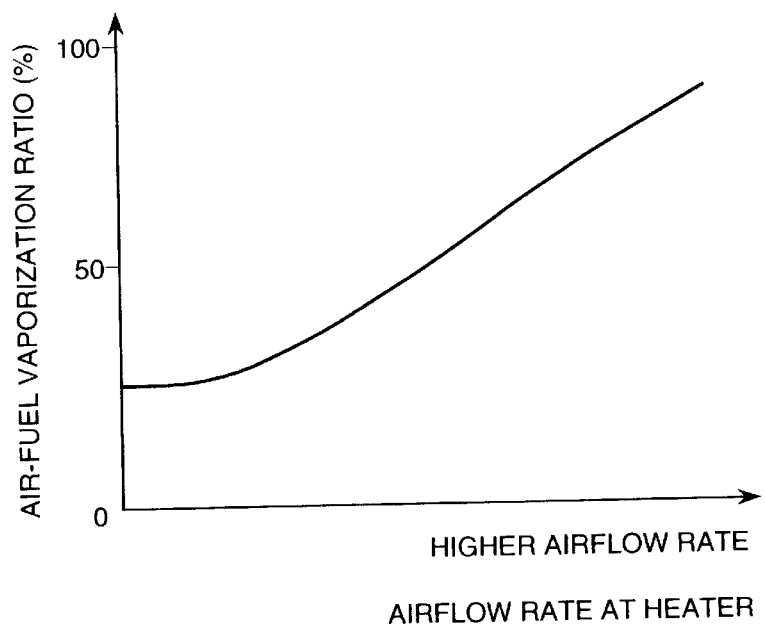
FIG. 8 a diagram showing the relationship between the air flow volume through the heater and the fuel gasification ratio.
Figure 7:
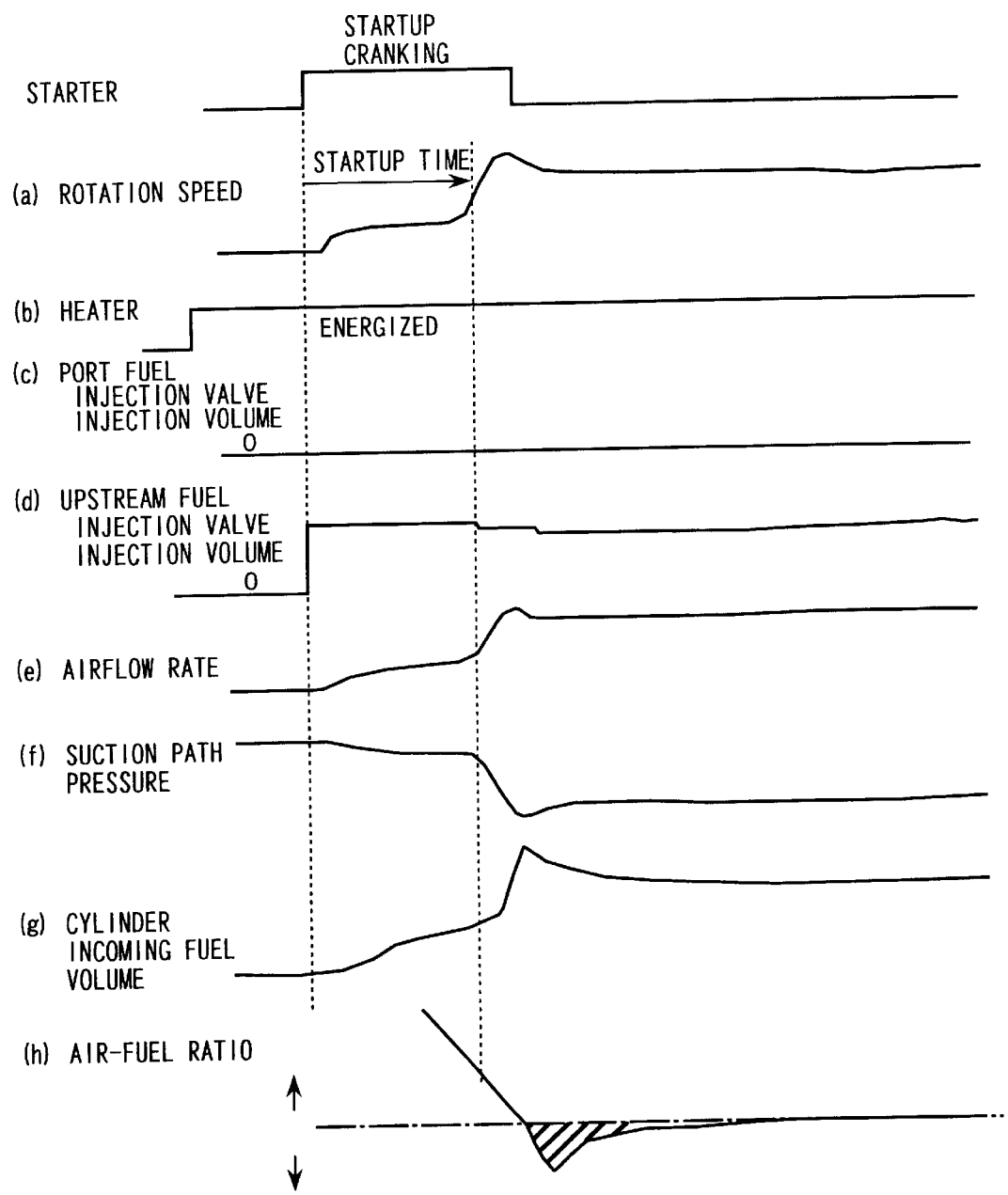
FIG. 7 start-up performance when the fuel is injected by the upstream fuel injection valve starting from the start-up.

To begin with, the start-up performance in case the fuel is injected by the upstream fuel injection valve starting from the start-up cranking is explained hereunder, using FIG. 7. As soon as the start-up cranking is started by the starter, the fuel injection by the upstream fuel injection valve starts as shown in (d). The fuel injection by the port fuel injection valve as shown in (c) is not yet started on this occasion. It is assumed in this explanation that energization of the heater was started at a suitable timing before the start-up and the heater has already been heated up to a certain extent as shown in (b). Since the air flow volume through the heater is low at the start-up cranking as shown in (e) and a thick fuel vapor layer is formed on the surface of the heater, gasification is restrained because of increased fuel vapor pressure and the fuel is not easily gasified because the suction air passage pressure is closer to the atmospheric pressure as shown in (f). It has been confirmed through an experiment by the inventor et al. that the gasification ratio of the fuel on the heater decreases because of the above two reasons. FIG. 8 shows the relationship between the air flow volume through the heater and the fuel gasification ratio. As the air flow volume increases, the fuel gasification ratio increases. This is because the fuel vapor on the heater is removed by the air flow and the fuel gasification ratio improves. Thus, during the start-up cranking, the fuel gasification ratio decreases because the air flow volume through the heater decreases and also the transport of the gasified fuel into the cylinder delays because the heater is located in the upstream. As a result, as shown in FIG. 7(g), the delay of the inflow fuel into the cylinder becomes remarkable and consequently the start-up time becomes as long as 1.6 seconds as shown in (a). On the contrary, when the fuel is injected by the port fuel injection valve starting from the start-up cranking, the start-up time is about 0.5 second. Thus, if the fuel is injected from the upstream fuel injection valve starting from the start-up cranking, the start-up performance becomes worse than when the engine is started with the injection by the port fuel injection valve. In addition, because a longer time is required for the inflow fuel into the cylinder to reach an amount enough for stable combustion, a lot of hazardous unburnt gas is exhausted until the complete explosion. Also because the fuel that has not been gasified but adhered much on the heater during the start-up cranking is evaporated suddenly as shown in (g) as a result of reduced suction air passage pressure after the start-up, an excessive fuel condition is caused as shown in (h) and consequently a lot of unburnt gas is exhausted after the start-up.

Figure 9:
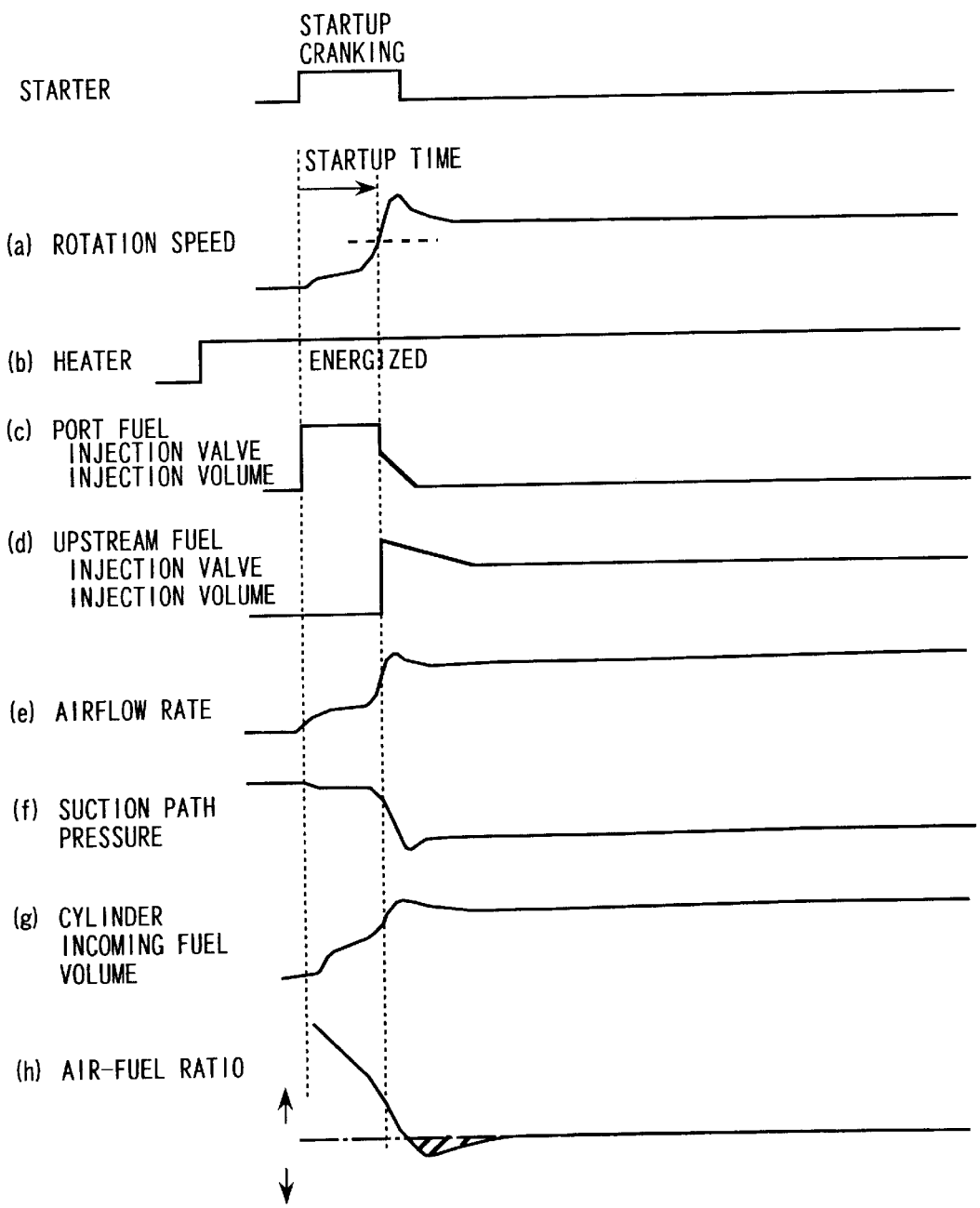
FIG. 9 an explanatory sketch (2) showing the injection control of the present invention.

In order to ensure the combustion stability and reduce the exhaust gas volume, it is preferred to be able to supply the gasified fuel quickly. In case of injecting the fuel by the upstream fuel injection valve starting from the start-up cranking, the gasification ratio of the heater is lower as explained before and consequently the start-up performance worsens and a lot of unburnt gas is exhausted. According to the present invention, on the contrary, the fuel injection by the upstream injection valve is started when the rotating speed has exceeded a specified value N0 for judging the completion of the start-up as shown in FIG. 9(d). Since the fuel gasification on the heater is facilitated as a result of the increased air flow volume and reduced suction air passage pressure after the rotation speed increase as shown in (e) and (f), the unburnt gas exhaust resulting from the adhesion of the fuel can be prevented. Further, since the fuel is injected by the port fuel injection valve starting from the start-up cranking up until the completion of the start-up, the amount of fuel adhesion becomes lower than in the start-up with the injection by the upstream fuel injection valve as explained before, the inflow fuel into the cylinder becomes faster as shown in (g), the start-up time is shortened to about 0.5 second, and the amount of unburnt gas exhaust can be reduced starting from the start-up cranking up until the complete explosion. Moreover, the variation of the air-fuel ratio resulting from the evaporation of the adhered fuel after the start-up can be minimized as shown in (h) and the amount of unburnt gas after the start-up can also be reduced.

In consideration of increased load to the battery or the like in case the starter operation and heater energization are conducted at the same time resulting in increased supply current, it may possibly be an idea to start the injection by the upstream fuel injection valve after the cranking (starter operation) is finished. However, since the cranking is initiated by a switching action by a driver, it is likely to happen that, if the cranking time is made longer by the operator's operation, supply of the gasified fuel delays and consequently the combustion worsens. With the present invention where the injection by the upstream fuel injection valve is started after the rotation speed has increased, the gasified fuel can be supplied to the cylinder without any delay at the start-up.

It is also allowable to set the start timing of the injection by the upstream fuel injection valve at the start-up to such that, in order to ensure a necessary amount of air for the gasification on the heater has been supplied, the injection is started after the air flow volume detected by the suction air volume sensor has exceeded a specified value.

When a pressure sensor is installed in the suction air passage, it is also allowable to start the injection by the upstream fuel injection valve when the detected suction air passage pressure has become lower than a specified value.

Further, it is also allowable to start the injection by the upstream fuel injection valve after a condition that the engine rotation is in excess of a specified speed, the suction air volume is in excess of a specified value, or the suction air passage pressure is lower than a specified value has continued for a specified delay time or longer after the cranking so as to prevent a faulty operation due to temporary engine speed variation, suction air volume variation or suction air passage pressure variation during the start-up. This enables to switch the injection valves under a condition that the engine speed has increased enough for stable combustion condition and also for obtaining a necessary amount of air for atomization of the fuel on the heater.

Next, for a system equipped with a port fuel injection valve, an air-assist type injection valve in the suction air passage in the upstream, and a heater, where part of the fuel injected by the upstream fuel injection valve is carried by air flow directly into the cylinder and, at the same time, the rest is adhered on the heater for gasification, a method of decreasing the power consumption of the heater is explained hereunder. According to an embodiment of U.S. Pat. No. 5,894,832, referred to previously as a prior art, there is disclosed a composition where whole fuel is adhered and gasified on the heater during idling, and the fuel gasification is facilitated as the energization of the heater is started as soon as the driver opens the door so as to heat up the heater before the engine start-up.

The above prior art involves a problem that the power consumption increases as the heater is energized (preheated) before the start-up.

Figure 10:
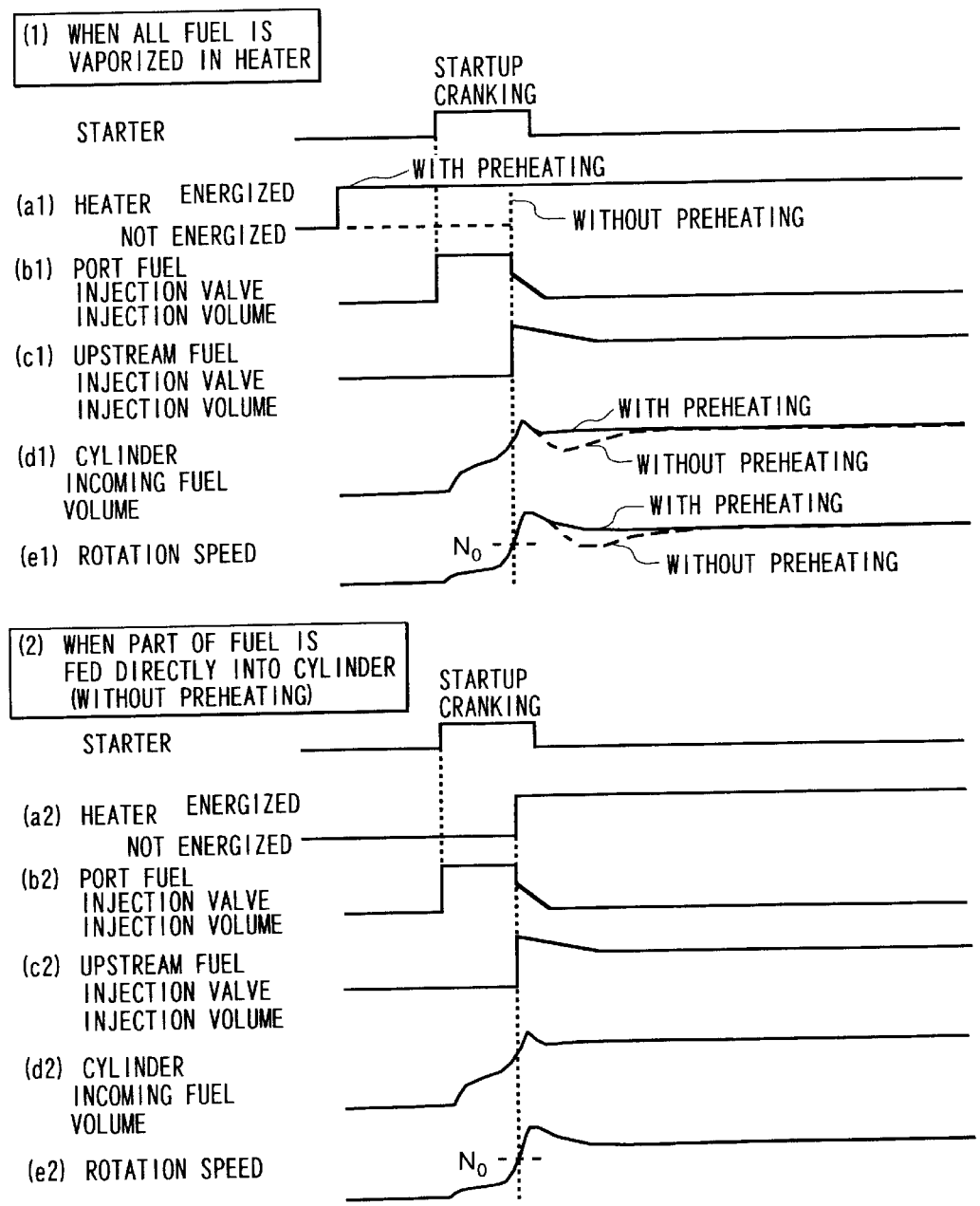
FIG. 10 a diagram showing the relationship between the start timing of the heater energization and the start-up performance.

With a composition where whole fuel is adhered and gasified on the heater as in the above-mentioned prior art, how the start-up performance differs between the cases when the energization of the heater is started (preheated) before the start-up and when it is not is explained hereunder, using FIG. 10(1). As explained before, if the fuel is injected by the upstream fuel injection valve during the start-up cranking, the gasification ratio of the heater becomes lower and consequently the start-up performance worsens and a lot of unburnt gas is exhausted. With this composition, therefore, the fuel is injected by the port fuel injection valve. Because the heater has already bee heated up if the heater energization (preheating) is started before the start-up as shown by a bold line in (a1), as soon as the fuel is injected by the upstream fuel injection valve after the start-up as shown in (c1), the gasified fuel is supplied quickly into the cylinder as shown by a bold line in (d1) and the rotation speed after the start-up is stable as shown by a bold line in (e1). On the contrary, if no preheating is operated as shown by a dotted line in (a1), the fuel gasification is not facilitated after the start of the fuel injection by the upstream fuel injection valve because the heater has not been heated up, the inflow of the gasified fuel delays as shown by a dotted line in (d1), and the combustion worsens, resulting in drop of the rotation speed after the start-up as shown by a dotted line in (e1).

On the other hand, with a composition shown in FIG. 2 where an air-assist type high-atomizing injection valve is employed as the upstream fuel injection valve and part of the fuel is not adhered on the heater but carried by air flow directly into the cylinder, even if no preheating is operated as shown in (a2) of FIG. 10(2), part of the fuel flows directly into the cylinder with no aid of the heater after the start of the injection by the upstream fuel injection valve and accordingly the fuel flows in very quickly as shown in (d2). It has been confirmed through an experiment by the inventor et al. that, even if the preheating before the start-up as in the above-mentioned prior art is not operated but the heater is energized after the start-up, neither worsened combustion nor drop of the engine rotation is caused as shown in (e2). In the present invention, the heater energization before the start-up as in the prior art is not operated but the energization of the heater and fuel injection by the upstream fuel injection valve are started after the start-up. As a result, the power consumed by the heater can be reduced. Before the start-up cranking, the fuel is injected by the port fuel injection valve and, therefore, no effect on the start-up performance is expected.

Figure 11:
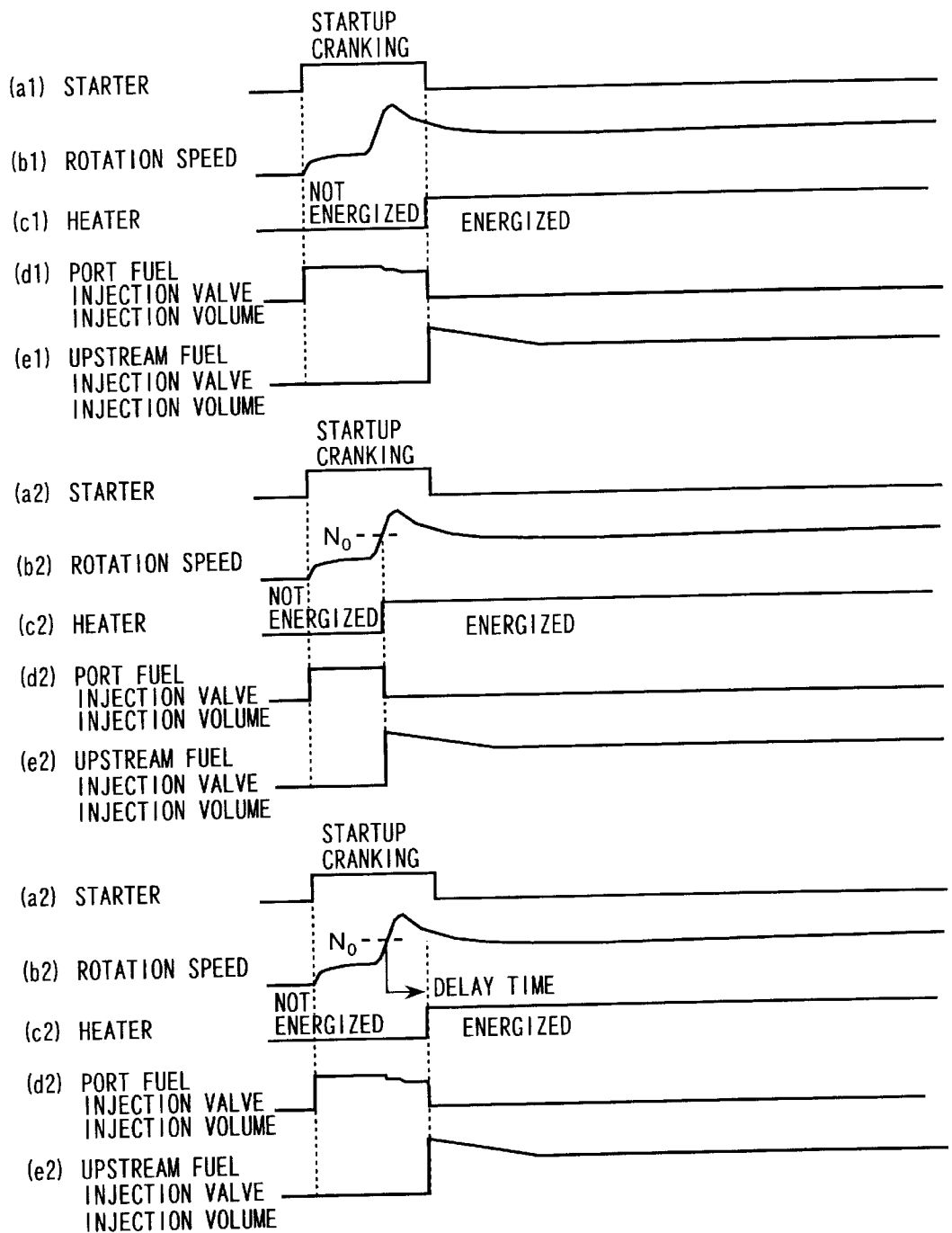
FIG. 11 an explanatory sketch showing the heater control of the present invention.

Heater control according to the present invention is explained hereunder, using FIG. 11.

In the first example, the energization of the heater (c1) and injection by the upstream fuel injection valve (e1) are started after the cranking (after the starter operation) as shown in (a1) of FIG. 11. During the starter operation, the fuel is injected by the port fuel injection valve (d1). Since the above prevents the starter operation and heater energization timing from overlapping, worsened start-up performance resulting from reduced supply current to the starter is not caused and, even if the battery capacity or power cable capacity has little allowance, it becomes possible to prevent deterioration of the battery and overheat of the power cable due to overcurrent, and deterioration of reliability.

In case the energization of the heater is prohibited during the starter operation as in the example above, the starter operation may happen to take a longer time as a result of driver's operation because the starter operation is initiated by a switching action by the driver. If this happens, the heater energization is likely to delay and the combustion to worsen after the start-up. In order to solve this problem, as shown in the second example, when the engine is started during the cranking in (a2) and the rotating speed has exceeded a specified rotation speed N0 for judging the completion of the start-up in (b2), the injection by the port fuel injection valve (d2) is stopped and at the same time the energization of the heater (c2) and injection by the upstream fuel injection valve (e2) are started.

With the above arrangement, even if the starter operation has been initiated for the start-up, the energization of the heater and injection by the upstream fuel injection valve are started when the engine rotation has increased in excess of a specified rotation speed N0 for judging the completion of the start-up. Accordingly, even if the starter operation takes a longer time as a result of the driver's operation, the energization of the heater does not delay and consequently worsened combustion and hazardous unburnt gas exhaust after the start-up can be prevented. Since power generation by an alternator is started when and after the engine rotation has reached the above specified rotation speed, voltage drop of the battery resulting from the heater energization can also be prevented.

Besides, since the energization of the heater is not started until the engine rotation has increased to a specified rotation speed N0 for judging the completion of the start-up during the cranking (starter operation), supply current to the starter can be secured and consequently the start-up performance can be prevented from worsening similarly as in the first example.

In a system, as shown in the third example, where the capacity of the battery power cable has little allowance and the life and reliability of the battery deteriorate or reliability of the power cable deteriorates if high current runs frequently, it is allowable that the energization is not started immediately when the engine rotation has increased to a specified rotation speed for judging the completion of the start-up but the energization and injection by the upstream fuel injection valve are started only when a specified delay time has elapsed after the engine rotation has increased to a specified rotation speed for judging the completion of the start-up or when a specified delay time has elapsed after the energization of the starter. The above delay time shall be set to a value that includes an average cranking time (starter operation time) and is not big enough to cause a remarkable effect on the exhaust. Until the above delay time has elapsed, the combustion stability after the start-up shall be maintained by increasing or decreasing the injection quantity from the port fuel injection valve. As a result, the starter operation and heater energization are prevented from overlapping during the start-up in an average cranking time and consequently the time and frequency of high current can be reduced. Thus, the life and reliability of the battery and reliability of the power cable can be prevented from deterioration. Even if the starter operation time becomes temporarily longer as a result of the driver's operation, worsened combustion and hazardous unburnt gas exhaust can be prevented because the energization of the heater is started before the combustion becomes worse even under the starter operation.

As explained above, with a composition where an air-assist type high-atomizing injection valve is employed as the upstream fuel injection valve and part of the injected fuel is carried by air flow directly into the cylinder with no aid of the heater, the delay time from the start of the injection by the upstream fuel injection valve until the fuel flows into the cylinder is short. Thus, preheating before the start-up is not needed and accordingly the power consumption can be reduced.

The method, where the energization of the heater is prohibited during the start-up cranking (starter operation) until the engine rotation has increased sufficiently and the heater is energized only when the engine rotation has increased to a specified rotation speed for judging the completion of the start-up as shown in the second example and the third example, is applicable to a conventional system where whole fuel injected by the upstream fuel injection valve is adhered and gasified on the heater. Even if the energization time by the starter operation becomes longer as a result of the driver's operation, the energization of the heater does not delay because the energization is started when the engine rotation has increased or when a specified delay time with no effect on the combustion has elapsed after the engine rotation has increased, resulting in the prevention of worsened combustion. Besides, since the energization of the heater is started when the engine rotation has increased, the power generation function of the alternator is sufficiently maintained and consequently it will not happen that an effect is given on the operations of other parts due to the power supply voltage drop resulting from the energization of the heater. Further, since the energization of the heater is prohibited until the engine rotation has increased during the start-up and accordingly the supply current of the starter is secured, no impact is given on the start-up performance. When the above applies, it is allowable to energize (preheat) the heater starting from before the start-up until the start of the start-up cranking, as required.

Figure 12:
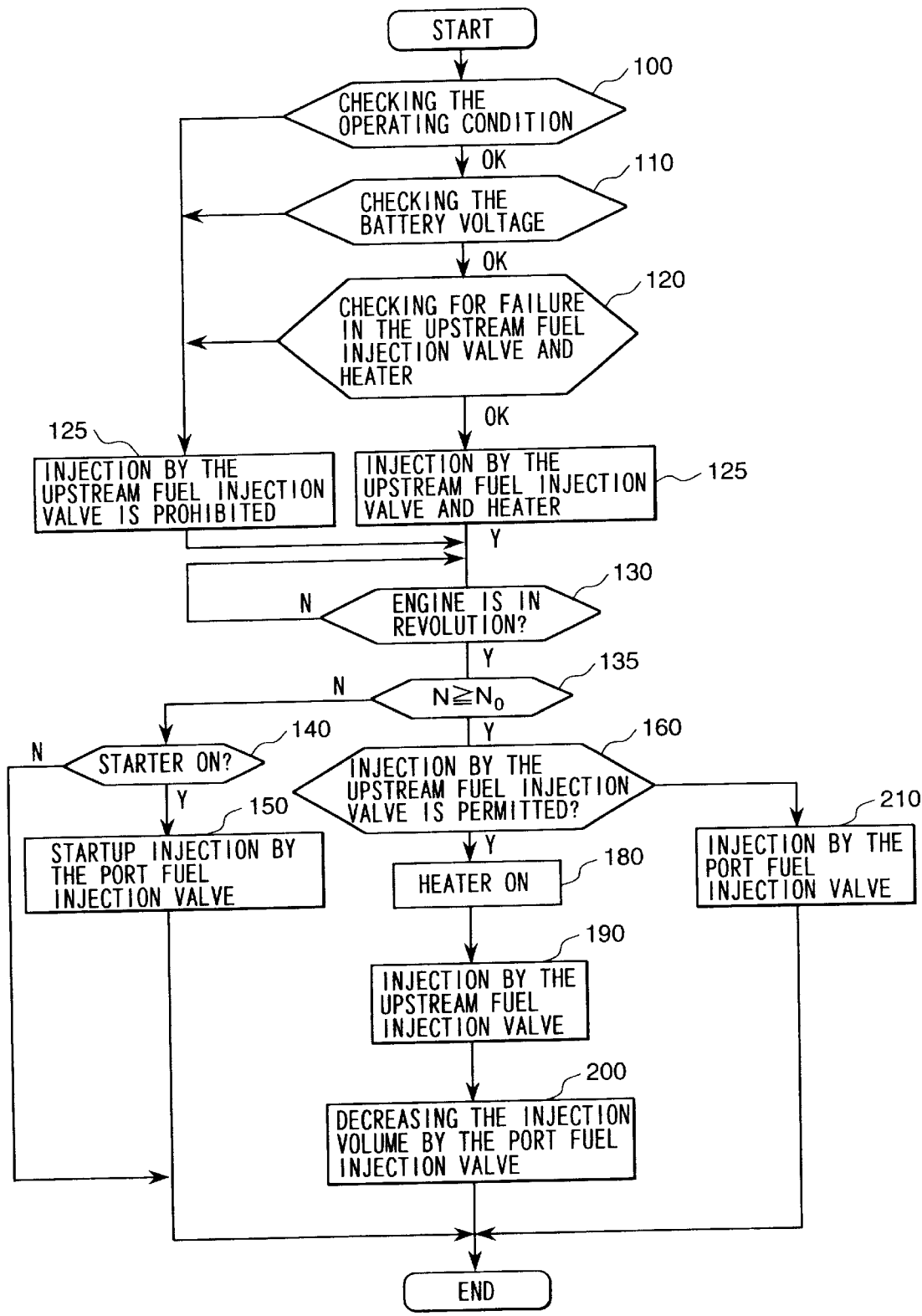
FIG. 12 control flow of the present invention.

Next, the injection control and heater control during the start-up in the above-mentioned embodiments are explained hereunder, using an example of the processing flow of a control unit as shown in FIG. 12.

First, in step 100, whether the engine operation is under a specified operating condition suitable for the injection by the upstream fuel injection valve is checked. With a composition equipped with a heater, for example, in order to reduce the power consumption of the heater, the energization of the heater and injection by the upstream fuel injection valve should not be permitted under a condition where the engine temperature is higher and adhesion of the fuel on the suction air passage is less. The energization of the heater and injection by the upstream fuel injection valve should not be permitted during the high-load operation because the pressure differential between the upstream of the throttle valve and the downstream of the injection valve decreases and consequently the air for atomization of the fuel decreases and the injection quantity of the upstream fuel injection valve decreases. The energization of the heater and injection by the upstream fuel injection valve is permitted only under a condition where the engine temperature is high enough and, if the fuel is injected by the port fuel injection valve, sufficient amount of the fuel adheres on the suction air passage.

In step 110, the battery voltage is checked, and the energization of the heater and injection by the upstream fuel injection valve should not be permitted when the battery has deteriorated resulting in voltage drop or the voltage is abnormal.

In step 120, the heater, heater control circuit, upstream fuel injection valve, and upstream fuel injection valve drive circuit are checked for failure and, when a failure is found in any one of the above or when a failure was found in the past and recovery to a normal condition has not been detected since then, the energization of the heater and injection by the upstream fuel injection valve should not be permitted.

When the energization of the heater and injection by the upstream fuel injection valve is permitted through the above steps, a permission flag is set ON in step 125. If the permission condition is not met in any of the above steps, the energization of the heater and injection by the upstream fuel injection valve should be prohibited (the permission flag be cleared) in step 127.

In step 130, whether the engine is in revolution is checked. If it is, whether the engine rotation has reached the rotation speed N0 at which the air for fuel atomization is supplied to the injection valve or whether the engine rotation has reached the rotation speed N0 at which the air necessary for the fuel atomization on the heater is supplied is checked in step 135. If the rotation is less than N0 in this step and also the starter is ON in step 140, the engine is regarded to be under the start-up cranking. Thus, in step 150, the injection of the fuel by the port fuel injection valve is started for the start-up. The injection quantity from the port fuel injection valve during the start-up is set as a function of the engine cooling water or rotation speed.

If the engine rotation has reached the rotation speed N0 in step 135, whether the injection by the upstream fuel injection valve is already permitted is checked in step 160. If it is, the heater is turned ON in step 180 and the injection by the upstream fuel injection valve is started in step 190. At the same time, in step 200, the injection by the port fuel injection valve is ceased or the injection quantity is decreased gradually to zero in step 200. At the time of the start of the fuel injection by the upstream fuel injection valve in step 190, the amount of the fuel injected is increased so as to reduce the gasification delay on the heater as explained previously. The increase and injection quantity (injection pulse width) of the fuel from the upstream fuel injection valve are calculated, for example, by the equation below.

$$TIUP = KTI \times QA/NE \times (1 + KAS + KINJ + KFB + \ldots)$$

where:

TIUP: Injection pulse width of upstream fuel injection valve (when injecting fuel per rotation)

KTI: Injection quantity factor

QA: Suction air volume

NE: Engine rotation speed

KAS: Correction factor of increase at injection start

KINJ: Correction factor of injection valve characteristic (non-linear)

KFB: Correction factor of feedback by air-fuel sensor

The injection quantity factor KTI and the correction factor of injection valve characteristic KINJ are so set that the theoretical air-fuel ratio is realized when the other correction factors are 0.

The correction factor of increase KAS at the injection start of the upstream fuel injection valve can be a value corresponding to the heater current (heater temperature), suction air volume, engine rotation speed, suction air passage pressure, or related engine cooling water temperature or engine operating condition. For example, the initial value of KAS is set on the basis of one of the above parameters and, as the time elapses, the injection quantity is decreased down to 0 at a specified decrease speed as shown below.

$$KAS\ initial\ value = f(IHT, TW, \ldots)$$

IHT: Heater temperature

TW: Engine cooling water temperature

If the increase characteristic of the upstream fuel injection valve at the start of the injection or the decrease characteristic of the port fuel injection valve in step 200 is to be varied on the basis of the heater temperature, the energization of the heater shall be started at the time when the engine rotation has exceeded N0 and, in consideration of possible operation delay until the heater relay is set closed, the heater current be measured and heater temperature be detected when a specified delay time has elapsed after the energization of the heater. Then, after the above, the increase characteristic shall be calculated and the injection by the upstream fuel injection valve be started.

If the injection by the upstream fuel injection valve is not permitted yet in step 160, the injection by the port fuel injection valve is started in step 210. When the injection control of the invention is applied to a composition shown in FIG. 3 where no heater is employed, any control processing relating to the heater can be removed from the control flow.

The above control is applicable also to an inner injection type engine if an inner injection valve is substituted for the port fuel injection valve.

Figure 14:
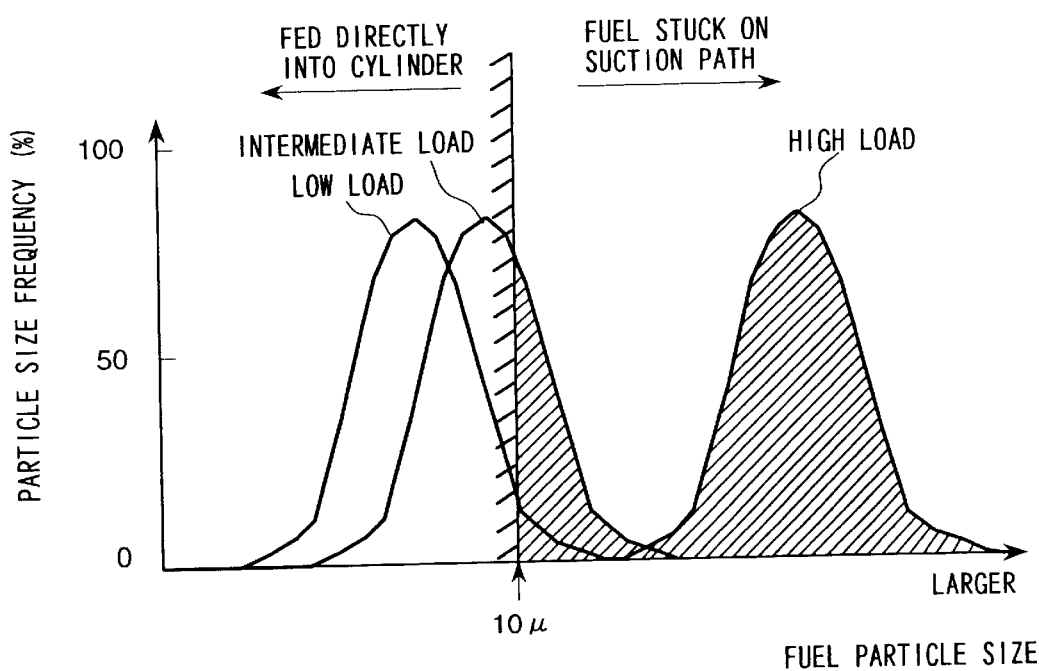
FIG. 14 a chart showing the relationship between the engine load and the fuel particle size distribution.
Figure 15:
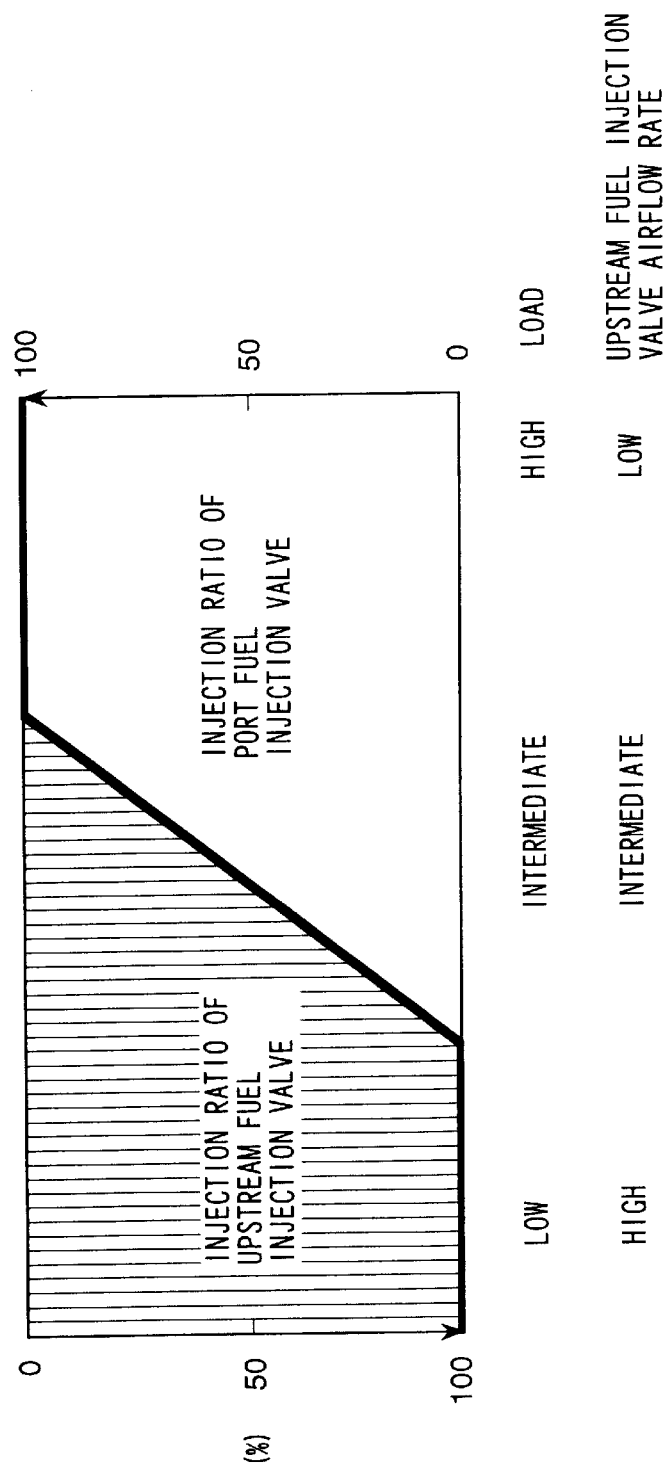
FIG. 15 example of the injection quantity ratio set between the upstream fuel injection valve and the port fuel injection valve corresponding to the engine load.

With a composition shown in FIG. 2 or FIG. 3 where an air-assist type high-atomizing injection valve is employed as the upstream fuel injection valve, the atomization is not facilitated not only during the start-up cranking but also during the high-load operation because the pressure differential between the upstream of the throttle valve and the downstream of the injection valve decreases and consequently the air for atomization of the fuel of the injection valve becomes short. Because of the above, there remains a problem that, if the fuel is injected by the upstream fuel injection valve during the high-load operation, fuel is not carried by air flow into the cylinder but adhered on the suction air passage, resulting in worsened combustion. FIG. 14 shows the relationship between the load condition and the particle size distribution of the fuel from the upstream fuel injection valve. Since sufficient air for atomization is supplied under a low-load operation, most of the fuel is atomized into the particle sizes within 10 microns, which are small enough for the particles to be carried by air flow directly into the cylinder. Thus, the injection of high-atomized fuel by the upstream fuel injection valve enables to prevent fuel adhesion on and after a cold condition of the engine, realizing excellent combustion. Under an intermediate-load operation, part of the fuel comes in 10 microns or greater but the rest is atomized into the particle sizes within 10 microns. Under a high-load operation, since the air for atomization becomes short and the average particle size becomes, for example, 120 microns or greater, the fuel adheres on the suction air passage and the inflow of the fuel into the cylinder delays, resulting in worsened combustion and increased hazardous content in the exhaust gas. The air-assist type injection valve involves a problem that sufficient air for atomization is not supplied under a high-load operation and consequently the combustion worsens as explained above. To solve the problem in the present invention, as shown in FIG. 15, whole fuel shall be injected by the upstream fuel injection valve under a low-load operation, where sufficient air for atomization is supplied, so as to better improve the combustion than in a case where the fuel is injected by the port fuel injection valve. Under a high-load condition, where the air for atomization of the fuel from the upstream fuel injection valve becomes short and consequently the particle sizes of the fuel from the upstream fuel injection valve become greater than those of the fuel from the port fuel injection valve, whole injection quantity shall be covered by the injection from the port fuel injection valve so as to prevent the combustion from worsening. Under an intermediate-load operation, where the fuel injected from the upstream fuel injection valve contains particle sizes greater than 10 microns and smaller than 10 microns in mixture, the injection quantity ratio between the upstream fuel injection valve and the port fuel injection valve shall be specified so as to realize optimum combustion. The load to the engine can be calculated from the air flow volume detected by the suction air volume sensor and the engine rotation speed. It is also allowable to vary the injection quantity ratio on the basis of the pressure detected by the suction air pressure sensor corresponding to the engine load. It is also allowable in the above-mentioned injection control to change the composition so that part of the fuel injected by the upstream fuel injection valve is gasified by a heater.

Varying the injection quantity ratio between the upstream fuel injection valve and the port fuel injection valve in accordance with the engine operating condition as explained above enables to operate the engine always under the best combustion condition and to reduce the amount of discharge of components resulting in hazardous exhaust gas.

Although the embodiment explained above shows an application to an engine equipped with an injection valve on the suction port of each cylinder, the present invention is applicable also to an inner injection type engine and a similar effect can be attained if an inner injection valve is substituted for the port fuel injection valve.

As explained above, with a composition where there are provided a port fuel injection valve installed on each cylinder and an air-assist type high-atomizing fuel injection valve (upstream fuel injection valve) in the upstream of a suction air passage and part or whole of the fuel is let flow directly into the cylinder, improvement of the combustion after the start-up is aimed and further, during the start-up cranking where the air for atomization of the fuel from the upstream fuel injection valve decreases and the atomization is not facilitated, the fuel is injected by the port fuel injection valve. Thus, worsened start-up performance and unburnt gas exhaust can be prevented.

With a composition equipped with a port fuel injection valve installed on each cylinder, upstream fuel injection valve installed in the upstream of a suction air passage, and heater for atomizing the fuel injected by the upstream fuel injection valve, improvement of the combustion after the start-up is aimed and further, during the start-up cranking, the fuel is injected by the port fuel injection valve and the injection by the upstream fuel injection valve is started when the engine rotation has increased to a speed at which necessary air for fuel gasification on the heater can be secured. Thus, worsened start-up performance and unburnt gas exhaust can be prevented.

Besides, with a composition where part of the fuel injected by an air-assist type upstream fuel injection valve is let flow directly into the cylinder and the rest is gasified by a heater, since the inflow of the fuel into the cylinder immediately after the start of the injection by the upstream fuel injection valve becomes faster, energization (preheating) of a heater is not started before the start-up. Thus the power consumption can be reduced.

Besides, since the amount of air for atomization of the fuel injected by the upstream fuel injection valve depends upon the engine load, varying the injection quantity ratio between the upstream fuel injection valve and the port fuel injection valve in accordance with the engine operating condition makes it possible to operate the engine always under the best combustion condition and to reduce the amount of discharge of components resulting in hazardous exhaust gas.

What is claimed is:

1. A fuel supply system for an internal combustion engine, comprising a port fuel injection valve near a suction port of each cylinder; an air-assist type upstream fuel injection valve in a suction air passage upstream of the port fuel injection valve or in an auxiliary air passage bypassing a throttle valve so as to facilitate atomization of the fuel by introducing air into or near a fuel injection port;

an injection controlling means for injecting fuel during start-up cranking of the internal combustion engine at least by the port fuel injection valve and injecting fuel as well after start-up at least by the upstream fuel injection valve; and a heater for gasifying injection fuel of the upstream fuel injection valve.

2. A fuel supply system for an internal combustion engine according to claim 1, wherein the injection controlling means injects fuel during the start-up cranking at least by the port fuel injection valve and injects fuel at least by the upstream fuel injection valve upon an engine rotation speed exceeding a specified value or upon a suction air passage pressure becoming less than a specified value.

3. A fuel supply system for an internal combustion engine according to claim 1, wherein the injection controlling means injects fuel during the start-up cranking at least by the port fuel injection valve and injects fuel at least by the upstream fuel injection valve when a specified delay time has elapsed after an engine rotation speed exceeds a specified value or when a specified delay time has elapsed after a suction air passage pressure becomes less than a specified value.

4. A fuel supply system for an internal combustion engine according to claim 1, wherein the heater gasifies part of the injection fuel of the upstream fuel injection valve, and a heater controlling means is provided for energizing the heater.

5. A fuel supply system for an internal combustion engine, comprising a port fuel injection valve near a suction port of each cylinder; an upstream fuel injection valve in a suction air passage upstream of the port fuel injection valve or in an auxiliary air passage bypassing a throttle valve; a heater in an injection direction of the upstream fuel injection valve to gasify at least part of the injection fuel of the upstream fuel injection valve; a heater controlling means for energizing the heater; and an injection controlling means for injecting fuel during a start-up cranking at least by the port fuel injection valve and for injecting fuel at least by the upstream fuel injection valve upon occurrence of one of an engine rotation speed exceeding a specified value, a suction air passage pressure becoming lower than a specified value, and a detected suction air volume exceeding a specified value.

6. A fuel supply system for an internal combustion engine, comprising a port fuel injection valve near a suction port of each cylinder; an upstream fuel injection valve in a suction air passage in the upstream of the port fuel injection valve or in an auxiliary air passage bypassing a throttle valve; an injection controlling means for injecting fuel during start-up cranking at least by the port fuel injection valve and, after start-up, switches the injection valves by decreasing an injection quantity of the port fuel injection valve gradually and simultaneously gradually increasing an injection quantity of the upstream fuel injection valve; a heater that gasifies, as required, at least part of the injection fuel of the upstream fuel injection valve; and a heater controlling means for energizing the heater; wherein the injection controlling means varies a decrease characteristic of the port fuel injection valve or an increase characteristic of the upstream fuel injection valve after the start-up based on at least one of engine cooling water temperature, suction air passage pressure, engine rotation speed, heater temperature, heater current, heater energizing time, start-up time, and suction air volume.

7. A fuel supply system for an internal combustion engine, comprising a port fuel injection valve near a suction port of each cylinder; an upstream fuel injection valve in a suction air passage upstream of the port fuel injection valve or in an auxiliary air passage bypassing a throttle valve to supply part of the injection fuel directly to the cylinder; a heater arranged in an injection direction of the upstream fuel injection valve to gasify at least part of the injection fuel of the upstream fuel injection valve; a heater controlling means for energizing the heater; and an injection controlling means for injecting fuel during start-up cranking at least by the port fuel injection valve; wherein the heater controlling means is configured so as to not energize the heater before the start-up cranking.

8. A fuel supply system for an internal combustion engine according to claim 7, wherein the heater controlling means is configured so as to not energize the heater during a starter operation in start-up so as to start energizing the heater upon the starter ceasing operation.

9. A fuel supply system for an internal combustion engine, comprising a port fuel injection valve near a suction port of each cylinder; an upstream fuel injection valve in a suction air passage upstream of the port fuel injection valve or in an auxiliary air passage bypassing a throttle valve; a heater arranged in an injection direction of the upstream fuel injection valve to gasify at least part of the injection fuel of the upstream fuel injection valve; a heater controlling means for energizing the heater; and an injection controlling means for injecting fuel during start-up cranking at least by the port fuel injection valve; wherein the heater controlling means is configured to start energizing the heater when an engine rotation speed exceeds a specified value during start-up or after a specified delay time has elapsed when the engine rotation speed exceeds a specified value.

10. A fuel supply system for an internal combustion engine, comprising a port fuel injection valve near a suction port of each cylinder; an air-assist type upstream fuel injection valve in a suction air passage upstream of the port fuel injection valve or in an auxiliary air passage bypassing a throttle valve to facilitate fuel atomization by introducing air into or near a fuel injection port; an injection controlling means for varying injection quantity ratio of the port fuel injection valve to the upstream fuel injection valve; and a heater for gasifying injection fuel of the upstream fuel injection valve.

11. A fuel supply system for an internal combustion engine according to claim 10, wherein the fuel controlling means varies the injection quantity ratio of the port fuel injection valve to the upstream fuel injection valve in accordance with a detected value of any one of suction air volume of an internal combustion engine, engine rotating speed, and suction air passage pressure.

12. A fuel supply system for an internal combustion engine according to claim 10, wherein the heater gasifies at least part of the injection fuel of the upstream fuel injection valve, and a heater controlling means is provided for energizing the heater.

13. A fuel supply system for an internal combustion engine, comprising a fuel injection valve on each cylinder; an air-assist type fuel injection valve in a suction air passage upstream of the fuel injection valve or in an auxiliary air passage bypassing a throttle valve upstream of the fuel injection valve to facilitate atomization of the fuel by introducing air into or near a fuel injection port; an injection controlling means for injecting fuel so that a fuel injection quantity of the fuel injection valve is greater than that of the fuel injection valve during start-up cranking and that the fuel injection quantity of the fuel injection valve is greater than that of the fuel injection valve after start-up; and a heater for gasifying injection fuel of the upstream fuel injection valve.

14. A fuel supply system for an internal combustion engine, comprising a fuel injection valve on each cylinder; a fuel injection valve in a suction air passage upstream of the fuel injection valve or in an auxiliary air passage bypassing a throttle valve upstream of the fuel injection valve; a heater arranged in an injection direction of the fuel injection valve to gasify at least part of the injection fuel of the fuel injection valve; a heater controlling means for energizing the heater; and an injection controlling means for injecting fuel so that a fuel injection quantity of the fuel injection valve is greater than that of the fuel injection valve during start-up cranking and that the fuel injection quantity of the fuel injection valve is greater than that of the fuel injection valve upon occurrence of one of an engine rotation speed exceeding a specified value, a suction air passage pressure becoming lower than a specified value, and a detected suction air volume exceeding a specified value.

15. A fuel supply system for an internal combustion engine, comprising a fuel injection valve on each cylinder; a fuel injection valve in a suction air passage upstream of the fuel injection valve or in an auxiliary air passage bypassing a throttle valve upstream of the fuel injection valve; an injection controlling means for injecting fuel so that a fuel injection quantity of the fuel injection valve is greater than that of the fuel injection valve during start-up cranking, and switches the injection valves after start-up by gradually decreasing the injection quantity of the fuel injection valve and simultaneously gradually increasing the injection quantity of the fuel injection valve; a heater that gasifies, as required, at least part of the injection fuel of the fuel injection valve; and a heater controlling means for energizing the heater; wherein the injection controlling means varies a decrease characteristic of the fuel injection valve or an increase characteristic of the fuel injection valve after the start-up based on at least one of engine cooling water temperature, suction air passage pressure, engine rotation speed, heater temperature, heater current, heater energizing time, start-up time, and suction air volume.

16. A fuel supply system for an internal combustion engine, comprising a fuel injection valve on each cylinder; a fuel injection valve in a suction air passage upstream of the fuel injection valve or in an auxiliary air passage bypassing a throttle valve upstream of the fuel injection valve to supply at least part of injection fuel directly to the cylinder; a heater arranged in an injection direction of the fuel injection valve to gasify at least part of the injection fuel of the fuel injection valve; a heater controlling means for energizing the heater; and an injection controlling means for injecting fuel so that a fuel injection quantity of the fuel injection valve is greater than that of the fuel injection valve during start-up cranking; wherein the heater controlling means is configured so as to not energize the heater before start-up cranking.

17. A fuel supply system for an internal combustion engine, comprising a fuel injection valve on each cylinder; a fuel injection valve in a suction air passage upstream of the fuel injection valve or in an auxiliary air passage bypassing a throttle valve upstream of the fuel injection valve; a heater arranged in an injection direction of the fuel injection valve to gasify at least part of the injection fuel of the fuel injection valve; a heater controlling means for energizing the heater; and an injection controlling means for injecting fuel so that a fuel injection quantity of the fuel injection valve is greater than that of the fuel injection valve during start-up cranking; wherein the heater controlling means is configured to start energizing the heater when the engine rotation speed exceeds a specified value during start-up or when a specified delay time has elapsed after an engine rotation speed exceeds a specified value.

18. A fuel supply system for an internal combustion engine, comprising a fuel injection valve on each cylinder; an air-assist type fuel injection valve in a suction air passage upstream of the fuel injection valve or in an auxiliary air passage bypassing a throttle valve upstream of the fuel injection valve to facilitate fuel atomization by introducing air into or near a fuel injection port; an injection controlling means for varying an injection quantity ratio of the first-mentioned fuel injection valve to the air-assist type fuel injection valve, and a heater for gasifying injection fuel of the first-mentioned fuel injection valve.

19. A fuel supply system for an internal combustion engine according to claim 4, during a cold engine condition.

20. A fuel supply system for an internal combustion engine according to claim 5, during a cold engine condition.

21. A fuel supply system for an internal combustion engine according to claim 6, during a cold engine condition.

22. A fuel supply system for an internal combustion engine according to claim 7, during a cold engine condition.

23. A fuel supply system for an internal combustion engine according to claim 9, during a cold engine condition.

24. A fuel supply system for an internal combustion engine according to claim 14, during a cold engine condition.

25. A fuel supply system for an internal combustion engine according to claim 15, during a cold engine condition.

26. A fuel supply system for an internal combustion engine according to claim 16, during a cold engine condition.

27. A fuel supply system for an internal combustion engine according to claim 17, during a cold engine condition.

28. A fuel supply system for an internal combustion engine, comprising a port fuel injection valve near a suction port of each cylinder; an air-assist type upstream fuel injection valve in a suction air passage upstream of the port fuel injection valve or in an auxiliary air passage bypassing a throttle valve so as to facilitate atomization of the fuel by introducing air into or near a fuel injection port;
an injection controller configured to inject fuel during start-up cranking of the internal combustion engine at least by the port fuel injection valve and to inject fuel as well after start-up at least by the upstream fuel injection valve; and a heater for gasifying injection fuel of the upstream fuel injection valve.

29. A fuel supply system for an internal combustion engine according to claim 28, wherein the injection controller injects fuel during the start-up cranking at least by the port fuel injection valve and injects fuel at least by the upstream fuel injection valve upon an engine rotation speed exceeding a specified value or upon a suction air passage pressure becoming less than a specified value.

30. A fuel supply system for an internal combustion engine according to claim 28, wherein the injection controller injects fuel during the start-up cranking at least by the port fuel injection valve and injects fuel at least by the upstream fuel injection valve when a specified delay time has elapsed after an engine rotation speed exceeds a specified value or when a specified delay time has elapsed after a suction air passage pressure becomes less than a specified value.

31. A fuel supply system for an internal combustion engine according to claim 28, wherein the heater gasifies part of the injection fuel of the upstream fuel injection valve, and a heater controller is arranged to energize the heater.

32. A fuel supply system for an internal combustion engine, comprising a port fuel injection valve near a suction port of each cylinder; an upstream fuel injection valve in a suction air passage upstream of the port fuel injection valve or in an auxiliary air passage bypassing a throttle valve; a heater in an injection direction of the upstream fuel injection valve to gasify at least part of the injection fuel of the upstream fuel injection valve; a heater controlling means for energizing the heater; and an injection controller configured to inject fuel during a start-up cranking at least by the port fuel injection valve and to inject fuel at least by the upstream fuel injection valve upon occurrence of one of an engine rotation speed exceeding a specified value, a suction air passage pressure becoming lower than a specified value, and a detected suction air volume exceeding a specified value.

33. A fuel supply system for an internal combustion engine, comprising a port fuel injection valve near a suction port of each cylinder; an upstream fuel injection valve in a suction air passage in the upstream of the port fuel injection valve or in an auxiliary air passage bypassing a throttle valve; an injection controller configured to inject fuel during start-up cranking at least by the port fuel injection valve and, after start-up, to switch the injection valves by decreasing an injection quantity of the port fuel injection valve gradually and simultaneously gradually increasing an injection quantity of the upstream fuel injection valve; a heater that gasifies, as required, at least part of the injection fuel of the upstream fuel injection valve; and a heater controller configured to energize the heater; wherein the injection controller is operable to vary a decrease characteristic of the port fuel injection valve or an increase characteristic of the upstream fuel injection valve after the start-up based on at least one of engine cooling water temperature, suction air passage pressure, engine rotation speed, heater temperature, heater current, heater energizing time, start-up time, and suction air volume.

34. A fuel supply system for an internal combustion engine, comprising a port fuel injection valve near a suction port of each cylinder; an upstream fuel injection valve in a suction air passage upstream of the port fuel injection valve or in an auxiliary air passage bypassing a throttle valve to supply part of the injection fuel directly to the cylinder; a heater arranged in an injection direction of the upstream fuel injection valve to gasify at least part of the injection fuel of the upstream fuel injection valve; a heater controller configured to energize the heater; and an injection controller configured to inject fuel during start-up cranking at least by the port fuel injection valve; wherein
the heater controller is configured so as to not energize the heater before the start-up cranking.

35. A fuel supply system for an internal combustion engine according to claim 34, wherein the heater controller is configured so as to not energize the heater during a starter operation in start-up so as to start energizing the heater upon the starter ceasing operation.

36. A fuel supply system for an internal combustion engine, comprising a port fuel injection valve near a suction port of each cylinder; an upstream fuel injection valve in a suction air passage upstream of the port fuel injection valve or in an auxiliary air passage bypassing a throttle valve; a heater arranged in an injection direction of the upstream fuel injection valve to gasify at least part of the injection fuel of the upstream fuel injection valve; a heater controller configured to energize the heater; and an injection controller configured to inject fuel during start-up cranking at least by the port fuel injection valve; wherein the heater controller is configured to start energizing the heater when an engine rotation speed exceeds a specified value during start-up or after a specified delay time has elapsed when the engine rotation speed exceeds a specified value.

37. A fuel supply system for an internal combustion engine, comprising a port fuel injection valve near a suction port of each cylinder; an air-assist type upstream fuel injection valve in a suction air passage upstream of the port fuel injection valve or in an auxiliary air passage bypassing a throttle valve to facilitate fuel atomization by introducing air into or near a fuel injection port; an injection controller configured to vary an injection quantity ratio of the port fuel injection valve to the upstream fuel injection valve; and a heater for gasifying injection fuel of the upstream fuel injection valve.

38. A fuel supply system for an internal combustion engine according to claim 37, wherein the fuel controller is configured to vary the injection quantity ratio of the port fuel injection valve to the upstream fuel injection valve in accordance with a detected value of any one of suction air volume of an internal combustion engine, engine rotating speed, and suction air passage pressure.

39. A fuel supply system for an internal combustion engine according to claim 38, wherein the heater gasifies at least part of the injection fuel of the upstream fuel injection valve, and a heater controller is provided to energize the heater.

40. A fuel supply system for an internal combustion engine, comprising a fuel injection valve on each cylinder; an air-assist type fuel injection valve in a suction air passage upstream of the fuel injection valve or in an auxiliary air passage bypassing a throttle valve upstream of the fuel injection valve to facilitate atomization of the fuel by introducing air into or near a fuel injection port; an injection controller configured to inject fuel so that a fuel injection quantity of the fuel injection valve is greater than that of the fuel injection valve during start-up cranking and that the fuel injection quantity of the fuel injection valve is greater than that of the fuel injection valve after start-up; and a heater for gasifying injection fuel of the upstream fuel injection valve.

41. A fuel supply system for an internal combustion engine, comprising a fuel injection valve on each cylinder; a fuel injection valve in a suction air passage upstream of the fuel injection valve or in an auxiliary air passage bypassing a throttle valve upstream of the fuel injection valve; a heater arranged in an injection direction of the fuel injection valve to gasify at least part of the injection fuel of the fuel injection valve; a heater controller configured to energize the heater; and an injection controller configured to inject fuel so that a fuel injection quantity of the fuel injection valve is greater than that of the fuel injection valve during start-up cranking and that the fuel injection quantity of the fuel injection valve is greater than that of the fuel injection valve upon occurrence of one of an engine rotation speed exceeding a specified value, a suction air passage pressure becoming lower than a specified value, and a detected suction air volume exceeding a specified value.

42. A fuel supply system for an internal combustion engine, comprising a fuel injection valve on each cylinder; a fuel injection valve in a suction air passage upstream of the fuel injection valve or in an auxiliary air passage bypassing a throttle valve upstream of the fuel injection valve; an injection controller configured to inject fuel so that a fuel injection quantity of the fuel injection valve is greater than that of the fuel injection valve during start-up cranking, and switches the injection valves after start-up by gradually decreasing the injection quantity of the fuel injection valve and simultaneously gradually increasing the injection quantity of the fuel injection valve; a heater that gasifies, as required, at least part of the injection fuel of the fuel injection valve; and a heater controller configured to energize the heater; wherein the injection controller varies a decrease characteristic of the fuel injection valve or an increase characteristic of the fuel injection valve after the start-up based on at least one of engine cooling water temperature, suction air passage pressure, engine rotation speed, heater temperature, heater current, heater energizing time, start-up time, and suction air volume.

43. A fuel supply system for an internal combustion engine, comprising a fuel injection valve on each cylinder; a fuel injection valve in a suction air passage upstream of the fuel injection valve or in an auxiliary air passage bypassing a throttle valve upstream of the fuel injection valve to supply at least part of injection fuel directly to the cylinder; a heater arranged in an injection direction of the fuel injection valve to gasify at least part of the injection fuel of the fuel injection valve; a heater controller configured to energize the heater; and an injection controller configured to inject fuel so that a fuel injection quantity of the fuel injection valve is greater than that of the fuel injection valve during start-up cranking; wherein the heater controller is operative so as to not energize the heater before start-up cranking.

44. A fuel supply system for an internal combustion engine, comprising a fuel injection valve on each cylinder; a fuel injection valve in a suction air passage upstream of the fuel injection valve or in an auxiliary air passage bypassing a throttle valve upstream of the fuel injection valve; a heater arranged in an injection direction of the fuel injection valve to gasify at least part of the injection fuel of the fuel injection valve; a heater controller configured to energize the heater; and an injection controller configured to inject fuel so that a fuel injection quantity of the fuel injection valve is greater than that of the fuel injection valve during start-up cranking; wherein the heater controller is configured to start energizing the heater when the engine rotation speed exceeds a specified value during start-up or when a specified delay time has elapsed after an engine rotation speed exceeds a specified value.

45. A fuel supply system for an internal combustion engine, comprising a fuel injection valve on each cylinder; an air-assist type fuel injection valve in a suction air passage upstream of the fuel injection valve or in an auxiliary air passage bypassing a throttle valve upstream of the fuel injection valve to facilitate fuel atomization by introducing air into or near a fuel injection port; an injection controller configured to vary an injection quantity ratio of the first-mentioned fuel injection valve to the air-assist type fuel injection valve; and a heater for gasifying injection fuel of the first-mentioned fuel injection valve.

* * * * *